(12) United States Patent
Cui et al.

(10) Patent No.: US 11,877,016 B2
(45) Date of Patent: Jan. 16, 2024

(54) LIVE COMMENTS GENERATING

(71) Applicant: Microsoft Technology Licensing, LLC, Redmond, WA (US)

(72) Inventors: Lei Cui, Beijing (CN); Furu Wei, Redmond, WA (US); Shaohan Huang, Redmond, WA (US); Ming Zhou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 17/435,354

(22) PCT Filed: Mar. 16, 2020

(86) PCT No.: PCT/US2020/022878
§ 371 (c)(1),
(2) Date: Aug. 31, 2021

(87) PCT Pub. No.: WO2020/214299
PCT Pub. Date: Oct. 22, 2020

(65) Prior Publication Data
US 2022/0141503 A1 May 5, 2022

(30) Foreign Application Priority Data

Apr. 17, 2019 (CN) .......................... 201910309878.6

(51) Int. Cl.
*H04N 21/234* (2011.01)
*G06V 10/74* (2022.01)
(Continued)

(52) U.S. Cl.
CPC ..... *H04N 21/23418* (2013.01); *G06V 10/761* (2022.01); *H04N 21/233* (2013.01); *H04N 21/235* (2013.01); *H04N 21/4884* (2013.01)

(58) Field of Classification Search
CPC .......... H04N 21/23418; H04N 21/233; H04N 21/235; H04N 21/4884; H04N 21/4756;
(Continued)

(56) References Cited

U.S. PATENT DOCUMENTS 9,690,768 B2    6/2017  Badoiu et al.
11,017,173 B1*  5/2021  Lu ........................... G06N 3/044
(Continued)

FOREIGN PATENT DOCUMENTS

| CN | 101887439 A | 11/2010 |
|----|-------------|---------|
| CN | 106921891 A | 7/2017 |

(Continued)

OTHER PUBLICATIONS

"First Office Action and Search Report Issued in Chinese Patent Application No. 201910309878.6", (w/ English Summary), dated Sep. 27, 2021, 12 Pages.
(Continued)

*Primary Examiner* — Adil Ocak
(74) *Attorney, Agent, or Firm* — Schwegman Lundberg & Woessner, P.A.

(57) ABSTRACT

The present disclosure provides a technical solution of live comments generating, which may acquire candidate texts highly similar with segments of video as live comments of corresponding segments by matching the candidate texts with the segments, and further generate new live comments based on video segments and existed live comments to enrich the live comments information of related video.

20 Claims, 9 Drawing Sheets

(51) Int. Cl.
*H04N 21/233* (2011.01)
*H04N 21/235* (2011.01)
*H04N 21/488* (2011.01)

(58) Field of Classification Search
CPC .. H04N 21/4788; G06V 10/761; G06V 10/82; G06V 20/40; G06F 16/44; G06F 16/483
See application file for complete search history.

(56) References Cited

U.S. PATENT DOCUMENTS

| | | | |
|---|---|---|---|
| 11,409,791 B2* | 8/2022 | Torabi | G06F 16/638 |
| 2006/0132504 A1 | 6/2006 | Tobita | |
| 2010/0057526 A1 | 3/2010 | Cheskis et al. | |
| 2013/0004138 A1 | 1/2013 | Kilar et al. | |
| 2013/0325954 A1 | 12/2013 | Cupala et al. | |
| 2014/0025757 A1 | 1/2014 | Haugen et al. | |
| 2014/0165086 A1 | 6/2014 | Avedissian et al. | |

FOREIGN PATENT DOCUMENTS

| | | |
|---|---|---|
| CN | 107979764 A | 5/2018 |
| CN | 108647255 A | 10/2018 |
| CN | 109348145 A | 2/2019 |

OTHER PUBLICATIONS

"Second Office Action Issued in Chinese Patent Application No. 201910309878.6", dated Feb. 10, 2022, 11 Pages.
"Office Action Issued in Chinese Patent Application No. 201910309878.6", dated Jun. 15, 2022, 14 Pages.
"Office Action Issued in Chinese Patent Application No. 201910309878.6", dated Mar. 2, 2023, 14 Pages.
Bin, et al., "Bidirectional Long-Short Term Memory for Video Description", In Repository of arXiv:1606.04631v1, Jun. 15, 2016, 5 Pages.
Hori, et al., "Attention-Based Multimodal Fusion for Video Description", In Repository of arXiv:1701.03126v2, Mar. 9, 2017, 8 Pages.
Li, et al., "Share-and-Chat : Achieving Human-Level Video Commenting by Search and Multi-View Embedding", In Proceedings of the 24th ACM International Conference on Multimedia, Oct. 15, 2016, pp. 928-937.
Ma, et al., "LiveBot: Generating Live Video Comments Based on Visual and Textual Contexts", In Repository of arXiv:1809.04938v1, Sep. 13, 2018, 9 Pages.
"International Search Report and Written Opinion Issued in PCT Application No. PCT/US20/022878", dated Jul. 7, 2020, 11 Pages.
Ramos, et al., "Fast-Forward Video Based On Semantic Extraction", In Proceedings of IEEE International Conference on Image Processing, Sep. 25, 2016, pp. 3334-3338.
Xu, et al., "Learning Multimodal Attention LSTM Networks for Video Captioning", In Proceedings of the 25th ACM International Conference on Multimedia, Oct. 23, 2017, 9 Pages.

* cited by examiner

LIVE COMMENTS GENERATING

CROSS-REFERENCE TO RELATED APPLICATION

This application is a U.S. National Stage Filing under 35 U.S.C. 371 of International Patent Application Serial No. PCT/US2020/022878, filed Mar. 16, 2020, and published as WO 2020/214299 A1 on Oct. 22, 2020, which claims priority to Chinese Application No. 201910309878.6, filed Apr. 17, 2019, which applications and publication are incorporated herein by reference in their entirety.

BACKGROUND

On the current video website, while a video is being played, the commentary subtitles, i.e., live comments, may be popped up on the screen. Such live comments may be characterized by being generated on real-time. That is to say, the timing for displaying the live comments is related to the timing for playing the video, and the live comments are the real-time comments made against the content being played at a certain time by a viewer. Abundant live comments may increase the fun of the viewer in watching video.

BRIEF SUMMARY

The embodiments of the present disclosure are provided to give a brief introduction to some concepts, which would be further explained in the following description. This Summary is not intended to identify essential technical features or important features of the subject as claimed nor to limit the scope of the subject as claimed.

With the technique for generating live comments as disclosed herein, candidate texts highly similar with segments of video may be acquired as live comments of corresponding segments by matching the candidate texts with the segments. In the embodiments of the present disclosure, new live comments may be further generated based on video segments and existed live comments to enrich the live comments information of related video.

The above description is merely a brief introduction of the technical solutions of the present disclosure, so that the technical means of the present disclosure may be clearly understood, and implemented according to the description of the specification, and the above and other technical objects, features and advantages of the present disclosure may be more obvious based on the embodiments of the present disclosure as follows.

DETAILED DESCRIPTION

Figure 1:
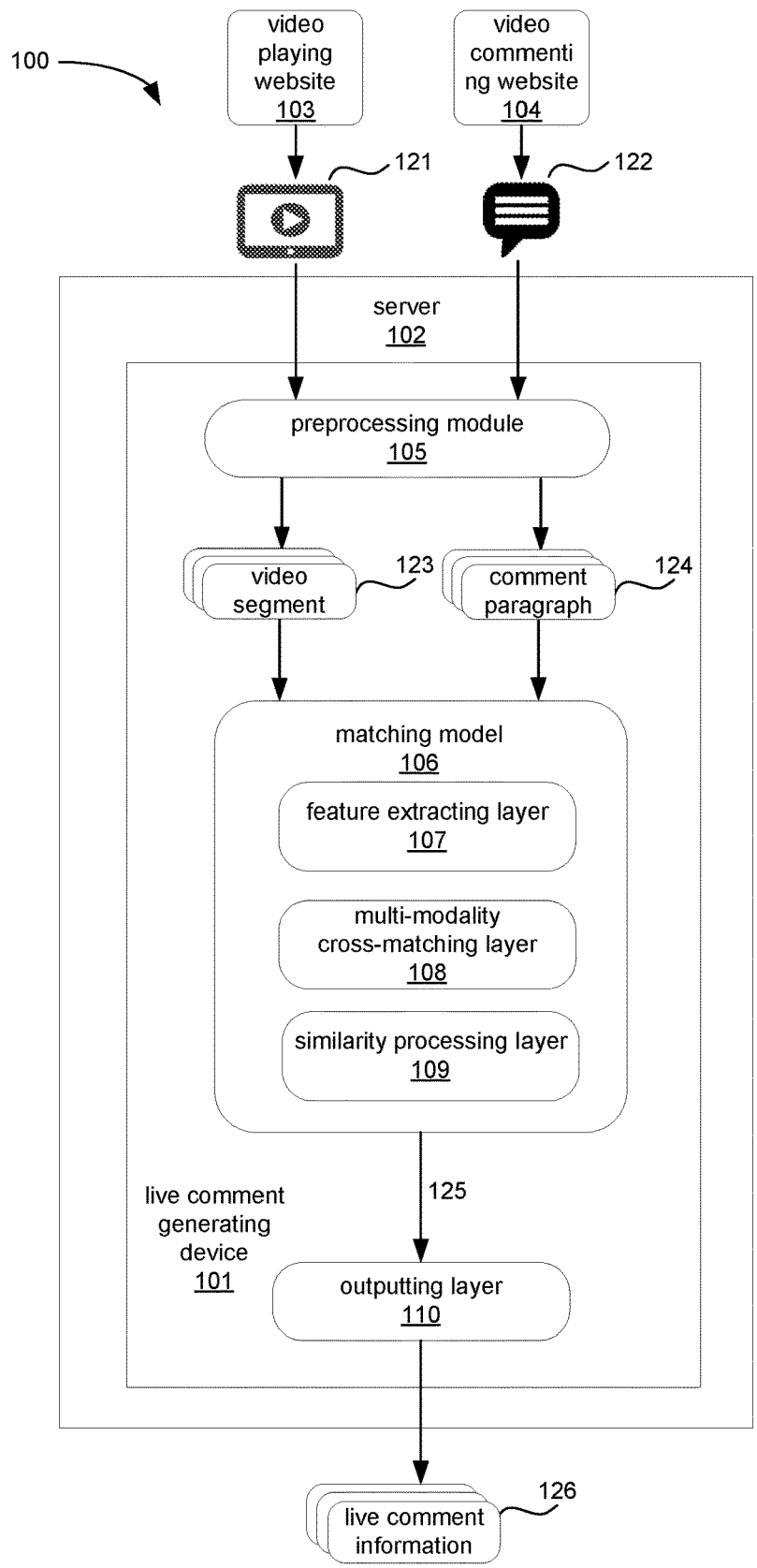
FIG. 1 is a schematic diagram showing a scenario where a live comment generating apparatus according to an embodiment of the present disclosure is applied.

In the following, description will be given in detail on the exemplary embodiments of the present disclosure, in connection with the accompanying drawing. Although drawings show the exemplary embodiments of the present disclosure, it should be appreciated that the present disclosure may be implemented in various ways without being limited by the embodiments set forth herein. On the contrary, these embodiments are provided for thorough understanding of the present disclosure, and completely conveying the scope of the present disclosure to the skills in the art.

The following description sets forth various examples along with specific details to provide a thorough understanding of claimed subject matter. It will be understood by those skilled in the art, however, the claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof.

In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "technique", as cited herein, for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

Overview

Embodiments of the present invention propose a technique for generating live comments based on candidate texts. Live comments are commentary subtitles, which are popped up on the screen while the video is playing. Such live comments are characterized by being generated on real-time. That is to say, the timing for displaying the live comments is related to the timing for playing the video, and the live comments are the real-time comments made with respect to the content being played at a certain time or during a certain period by a viewer. Abundant live comments may attract more users in watching the video and thus bring good experience to users.

On prior video playing websites, a large number of comments may have been accumulated with respect to some videos that were released early, but these comments have no time information and cannot be embedded in videos. That is to say, such comments cannot be converted into live comments so as to be displayed while the video is playing. Traditional comments on videos may be generally set in the comment area of the video playing website, or be on other websites such as video forums, and thus cannot be presented to the viewers along with the playing screen at the same time. Furthermore, traditional comments have no time information, and thus users cannot connect them with specific video segments when watching the video segments. Therefore, traditional video comments have less attraction to users than live comments.

For videos that are released recently, the videos have some live comments therewith, but there are some videos with less live comments or with the live comments of poor quality. There are abundant video comments of high quality on some video forums, social media websites, video playing platforms, and social apps.

Embodiments of the present invention are directed to providing a technique for generating live comments, by which live comments of a video may be generated based on candidate texts, such as comments on videos, thereby the richness of the live comments of video may be improved.

The above-mentioned comments on the video forum, the social media website, the video playing platform, and the social APP may actually exist as candidate texts, and in the embodiment of the present disclosure, candidate texts well matched with a video segment may be selected from a large number of sets of candidate texts and may be used as the live comments of the video segment. The set of candidate texts may be from a set of candidate texts consisted of a plurality of comments on a movie in a video forum, and live comments on various videos may be collected to form a set of candidate texts. In addition, the set of candidate texts may be further formed based on some existing movie review corpora. In summary, the selection on the sets of the candidate texts is not limited to comments directly related to the video, and may be made based on a wider range of corpora.

In the embodiment of the present invention, a machine learning model is proposed, in which similarity analysis between candidate text and video may be made to determine whether or not the candidate text is suitable to be used as a live comment of the video. In the machine learning model, based on the cross-focusing processing mechanism, feature fusion on the feature information of multiple modals of the video and the feature information of the candidate text may be made, so that comprehensively analyzing on the video information and the candidate text information may be made to select a candidate text more relevant to the video segment as a live comment.

Detailed description may be made on technical solutions according to embodiments of the present disclosure in the following examples.

EXAMPLES

As shown in FIG. 1, it is a schematic block diagram 100 depicting an application scenario of a live comment generating device. The live comment generating device 101 may be disposed on a server 102. The server 102 may be a distributed server implemented by one or more computer systems or a cloud-based cloud server, or may be a server in a local area network.

In the application scenario as shown in FIG. 1, the server 102 may obtain a video file 121 from a video playing website 103, obtain various comment information 122 from a video commenting website 104, and then input the video file 121 and the comment information 122 to a preprocessing module 105 in the live comment generating device 101. More particularly, the source where the video file 121 and the comment information 122 may be obtained is not limited to the illustrated content. For example, the video file 121 may also be a video provided by a client or provided by another video server, and the comment information 122 may also be from some social media websites, social apps, movie review apps, or be some comment information uploaded by users manually.

The pre-processing module 105 may split the video file into a plurality of video segments 123, and generate a plurality of comment paragraphs 124 based on a plurality of pieces of comment information. More particularly, according to actual needs or according to time or video content, a whole video file may be split into a plurality of video segments. For example, a movie may be split into a plurality of 1-minute segments. The video file may be also split into a plurality of video segments according to the content segment in the video. When the pre-processing module 105 generates a comment paragraph 124 based on the comment information, various processing operations may be performed according to the length of the comment information. Specifically, if the comment information is a short comment, the entire comment information may be used as a comment paragraph 124. If the comment information is relatively long (for example, a long comment, a review article, etc.), the entire comment information may be split into a plurality of comment paragraphs 124. The video segment 123 and the comment paragraph 124 may be then input into a matching model 106. In the matching model 106, matching processing may be performed between the comment paragraph 124, which is used as a candidate text, and the video segment 123, to determine whether or not the comment paragraph 124 is suitable to be used as a live comment for the video segment 123. In the matching model 106, each comment paragraph 124 and each video segments 123 may be compared one by one so that a similarity between each comment paragraph 124 and each video segment 123 may be calculated for subsequent selection on live comment Information.

The matching model 106 may include a feature extracting layer 107, a multi-modality cross-matching layer 108, and a similarity processing layer 109, each of which performs the following processing.

The feature extracting layer 107 may be configured to extract feature data of a plurality of modalities in the video segment 123 and extract feature data of comment paragraph 124. Specifically, the information of the multiple modalities in the video segment 123 may be coded individually, the feature data corresponding to the multiple modalities may be generated, and feature coding may be performed on the feature segment to generate feature data corresponding to the comment paragraph. Generally, information on multiple modalities may be included in a video segment. For example, a general video may include at least two modes of image and sound, and the prior online video may generally include some existing live comments and corresponding subtitles, etc. For the modality of the image, since the images of adjacent frames are substantially the same, an image of a frame may be extracted at a certain time interval rather than extracting the image of each frame.

The feature data described above may include a plurality of feature vectors. Taking image feature information as an example, it may be a set of frame vectors formed by performing feature coding on image of each frame, and the combination of the frame vectors may be input to the multi-modality cross-matching layer 108 in the form of a matrix. Correspondingly, for the feature information of the audio modal, a sound corresponding to the video may be divided into a plurality of audio segments, and then each audio segment may be encoded to form an audio feature vector. The plurality of audio feature vectors may form a set of audio feature vectors, and may be input into the multi-modality cross-matching layer 108 in a form of matrix. In addition, for existing subtitles or existing live comments, feature coding may be performed in unit of each sentence to form a set of text feature vectors, and input the set of text feature vectors into the multi-modality cross-matching layer 108 in a form of matrix. The comment paragraphs to be matched may be subjected to word segmentation processing, and then feature coding may be performed thereon in unit of each word to form a set of word vectors composed of word vectors, and input the set of word vectors into the multi-modality cross-matching layer 108 in a form of matrix.

The multi-modality cross-matching layer 108 may be configured to perform cross-attention processing according to the feature data corresponding to the multiple modalities and the feature data corresponding to the comment paragraph. The cross-attention processing may include the following operations: calculating a plurality of bidirectional attention data between the feature data of each modality and the feature data of each of other modalities and the feature data of the comment paragraph with respect to each modality, and superimposing the plurality of bidirectional attention data together, to obtain cross-attention data between the modality and each of other modalities and the comment paragraph; calculating the bidirectional attention data between the feature data of the comment paragraph and the feature data of each modality with respect to the comment paragraph, and superimposing the plurality of bidirectional attention data together to obtain cross-attention data between the comment paragraph and each modality.

The similarity processing layer 109 may be configured to calculate the similarity 125 between the video segment and the comment paragraph according to each cross-attention data corresponding to the video segment and the cross-attention data corresponding to the comment paragraph.

Finally, an outputting layer 110 may record a plurality of similarities 125 obtained by matching each comment paragraph in the set of comment paragraphs with the video segment, and perform ranking according to the final similarities to determine one or more comment paragraphs as the live comments of the video segment. More particularly, the comment paragraph at the top may be selected as the live comments of the video segment.

More particularly, in the matching model 106, the matching processing described above may be performed repeatedly on each of the plurality of video segments 123 and each of the plurality of comment paragraphs 124 to generate a plurality of similarities 125. The final live comment information 126 may be then determined based on the ranking of the plurality of similarities 125.

Figure 2:
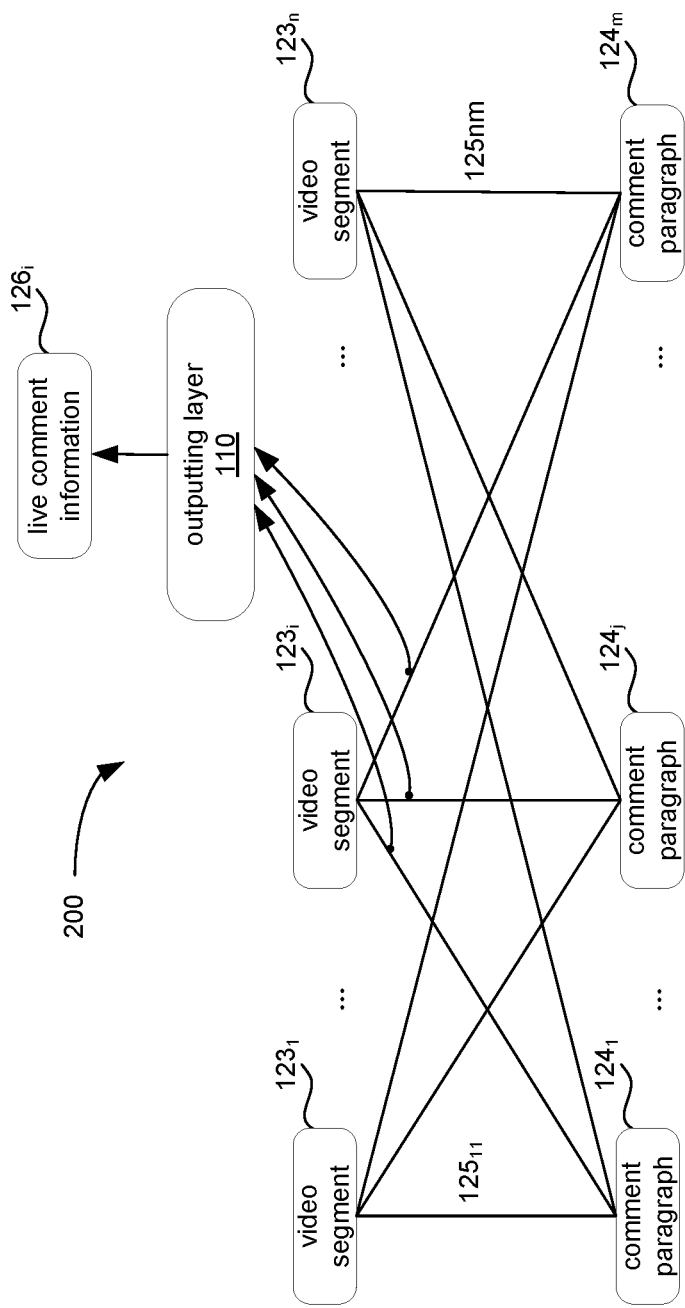
FIG. 2 is a schematic diagram of a similarity ranking process according to an embodiment of the present disclosure.

As shown in FIG. 2, it is a schematic diagram 200 describing the ranking on similarity. For example, it may be assumed that a video file is split into a plurality of video segments 1231, 1232, ..., 123$n$; and its corresponding comment information is split into a plurality of comment paragraphs 1241, 1242, ..., 124$m$. Then, a similarity 125$ij$ ((where $1 \leq i \leq n$), $1 \leq j \leq m$) may be calculated with respect to each video segment 123$i$ (where $1 \leq i \leq n$) and each comment paragraph 124$j$ (where $1 \leq j \leq m$). Then, the similarity ranking and outputting layer 110 may perform ranking on the similarity 125$i$1, 125$i$2, ..., 125$im$ between the video segment 123$i$ and each comment paragraph 124$j$, and the comment paragraph matched with the video segment 123$i$ may be determined according to a preset rule, and finally, the determined comment paragraph may be output as the live comment information 126$i$ of the video segment 123$i$.

Examples of Implementations

Figure 3:
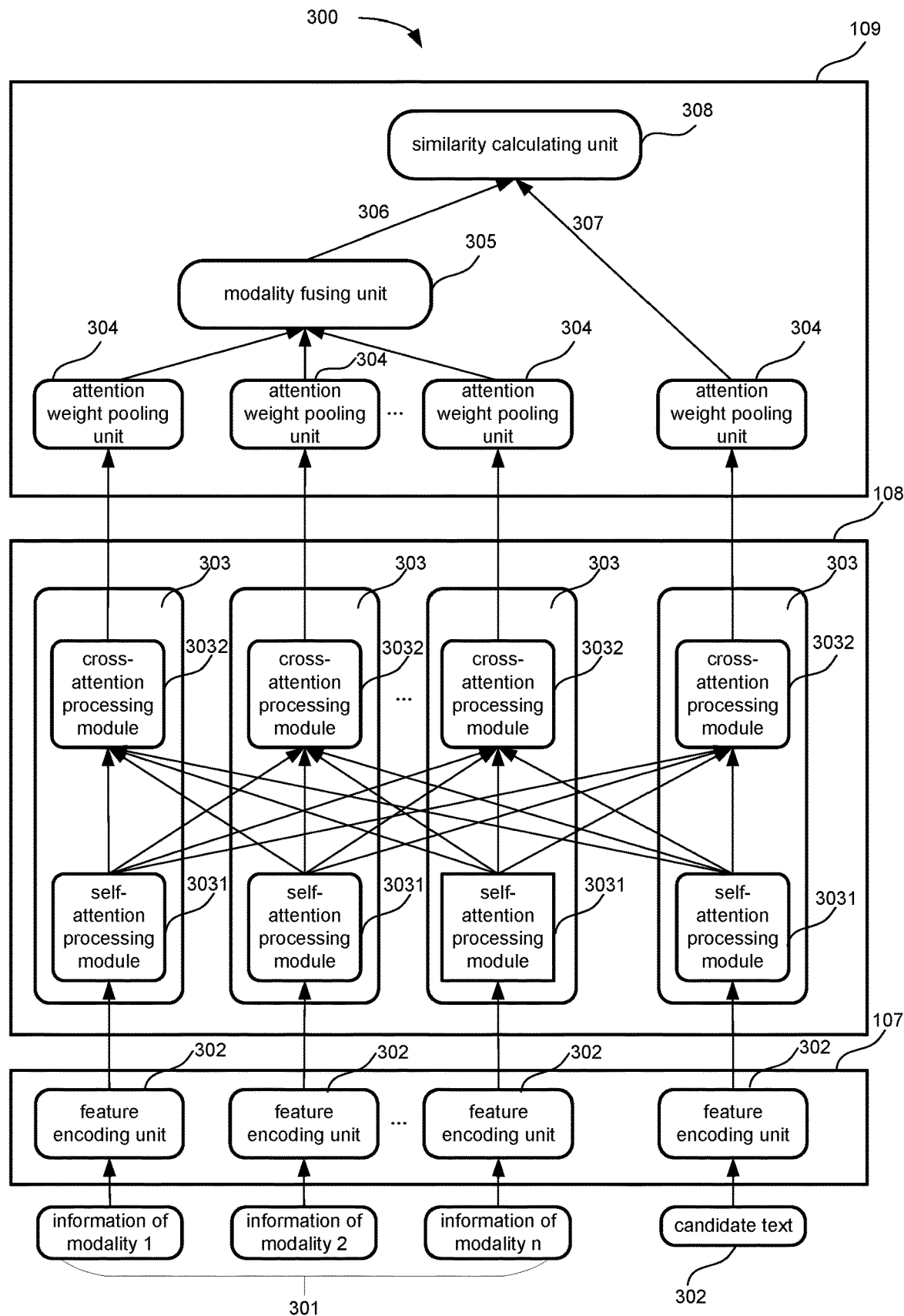
FIG. 3 is a block diagram showing an example of a matching model of a live comment generating apparatus according to an embodiment of the present disclosure.

As shown in FIG. 3, it is a structural block diagram 300 describing one of the examples of matching model in the live comment generating device according to the embodiment of the present invention. The block diagram 300 may further illustrate in detail the feature extracting layer 107, the multi-modality cross-matching layer 108, and the similarity processing layer 109 in the matching model 106 shown in the block diagram 100. It should be noted that the structure shown in FIG. 3 may be applied to a wider range as an independent machine learning model, and is not limited to the exemplary scenario shown in FIG. 1.

As shown in FIG. 3, the matching model 106 is a machine learning model according to an embodiment of the present invention, in which the feature information of each modality of the video segment may be subjected to cross-focus processing, so that the feature information of each modality is fused with each other, and the similarity between the video segment and the candidate text may be calculated based on the fused feature information.

The information 301 of each modality extracted from the video segment may be subjected to feature encoding processing by corresponding feature encoding unit 302 in the feature extracting layer 107 to generate feature data corresponding to each modality. Correspondingly, the candidate text 302 may be subjected to the feature encoding processing by the feature encoding unit 302 in the feature extracting layer 107 to generate feature data corresponding to the candidate text 302.

Each feature encoding unit 302 may adopt different encoding models according to each modality. For example, an image encoding model may be adopted for the image modality, and a sound encoding model may be adopted for the audio modality, and a text encoding model may be adopted for the text modality (for example, subtitles, live comments, etc.).

The respective feature data generated by the feature extracting layer 107 may be input to the multi-modality cross-matching layer 108 for further processing. The multi-modality cross-matching layer 108 may include attention processing units 303 corresponding to each of the modalities and the candidate texts respectively. Each of the attention processing units 303 may further include: a self-attention processing module 3031 and a cross-attention processing module 3032.

The self-attention processing module 3031 may be configured to perform self-attention calculation processing on the feature data of each modality and the feature data of the candidate text, and generate self-attention data of each modality and self-attention data of the candidate text.

The cross-attention processing module 3032 may be configured to generate cross-attention data between information of each modality and the candidate texts according to the self-attention data.

Specifically, the following processing may be performed with respect to each modality and candidate text, respectively: calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts; calculating bidirectional attention data between the self-attention data of the candidate text and the self-attention data of each modality with respect to the candidate text, and superimposing the plurality of bidirectional attention data together, to obtain cross-attention data between the candidate text and each modality.

In the multi-modality cross-matching layer 108, a plurality of feature vectors included in the feature data may be first fused according to self-attention weights through a self-attention calculating processing, and self-attention data representing the information of current modality or information of candidate text may be generated. The self-attention data may exist in a form of attention vectors. Then, a cross-attention processing may be performed on the self-attention data corresponding to each modality and the candidate text, so that the information of the modality and the candidate text are fused according to attention weights, to form cross-attention data containing the correlation between each modality and candidate texts, which may exist in a form of attention vectors.

The cross-attention data corresponding to the respective modalities and the candidate text generated by the multi-modality cross-matching layer 108 may be provided to the similarity processing layer 109 for similarity prediction processing.

The similarity processing layer 109 may be configured to perform a final fusing processing on the feature data of each modality, and perform similarity calculating on the fused feature data and the candidate text. The similarity processing layer 109 may include a modality fusing unit 305 and a similarity calculating unit 308.

The modality fusing unit 305 may be configured to fuse the cross-attention data corresponding to each modality to generate a fusion attention vector corresponding to the video segment. The fusion attention vector may be used in the similarity calculation as the vector representation 306 of the entire video segment.

The similarity calculating unit 308 may be configured to calculate a similarity between the fusion attention vector corresponding to the video segment and the cross-attention data corresponding to the candidate text, i.e., the vector representation 307 of the candidate text, as the similarity between the video segment and the candidate text.

Furthermore, the similarity processing layer 109 may further include a plurality of attention weight pooling units 304. The attention weight pooling unit 304 may be configured to perform pooling processing on the cross-attention data of each modality and the cross-attention data of the candidate text to generate a corresponding pooled attention vector. Accordingly, the modality fusing unit 305 may fuse the pooled attention vectors generated by the attention weight pooling unit 304 to obtain a fusion attention vector. And, in the similarity calculating unit 308, the similarity between the fusion attention vector corresponding to the video segment and the cross-attention data corresponding to the candidate text, i.e., the vector representation 307 of the candidate text may be calculated and used as the similarity between the video segment and the candidate text. The pooling processing may be used to decrease the feature dimensions and avoid over-fitting, so as to facilitate the fusion on the feature data of various modalities and the subsequent calculation on similarity.

With the structure of the matching model shown in FIG. 3, the similarity between a video segment and each candidate text in the set of candidate texts may be repeatedly calculated, so that the similarity may be used for subsequent similarity ranking and selecting of new live comments.

It should be noted that, in the structure shown in FIG. 3, in the feature extracting layer, each feature coding unit may use a corresponding feature coding unit according to the selected different modalities, and correspondingly, in the multi-modality cross-matching layer. Each attention processing unit may also adopt an attention processing unit corresponding to various modality.

A general video may have the fundamental modalities of image and sound. With respect to these two fundamental modalities, the feature extracting layer and the multi-modality cross-matching layer shown in FIG. 3 may be specifically configured as follows.

The feature extracting layer may include: a first text encoding unit, an image encoding unit, and a sound encoding unit.

More particularly, the first text encoding unit may be configured to perform semantic feature encoding on the candidate text to generate feature data of the candidate text. The image encoding unit may be configured to perform image feature encoding on the images of a plurality of frames in the video segment to generate feature data of the image modality. The sound encoding unit may be configured to perform audio feature encoding on the audio data in the video segment to generate feature data of the sound modality.

Correspondingly, the multi-modality cross-matching layer may include: a first text attention processing unit, an image attention processing unit, and a sound attention processing unit.

More particularly, the first text attention processing unit may be configured to calculate bidirectional attention data between the feature data of the candidate text and the feature data of the image modality and the feature data of the sound modality, and superimpose the two bidirectional attention data together to obtain cross-attention data of candidate texts. The image attention processing unit may be configured to calculate bidirectional attention data between the feature data of the image modality and the feature data of the sound modality, the feature data of the candidate text, and superimpose these two bidirectional attention data together to obtain cross-attention data of image modalities. The sound attention processing unit may be configured to calculate bidirectional attention data between feature data of the sound modality and the feature data of the image modality, the feature data of the candidate text, and superimpose these two bidirectional attention data to obtain cross-attention data for sound modalities.

In addition, the video on the current network may contain the modality of existing text in addition to the image modality and the sound modality. The existing text mentioned herein may include live comments and/or subtitles. Taking the video including the three modalities as an example, the feature extracting layer and the multi-modality cross-matching layer shown in FIG. 3 may be specifically configured as follows.

The feature extracting layer may include: a first text encoding unit, a second text encoding unit, an image encoding unit, and a sound encoding unit.

More particularly, the first text encoding unit may be configured to perform semantic feature encoding on the candidate text to generate feature data of the candidate text. The second text encoding unit may be configured to perform semantic feature encoding on the video text in the video segment to generate feature data of the existing text. The image encoding unit may be configured to perform image feature encoding on the images of a plurality of frames in the video segment to generate feature data of the image modality. The sound encoding unit may be configured to perform audio feature encoding on the audio data in the video segment to generate feature data of the sound modality.

The multi-modality cross-matching layer may include: a first text attention processing unit, a second text attention processing unit, an image encoding unit, and a sound encoding unit.

More particularly, the first text attention processing unit may be configured to calculate bidirectional attention data between feature data of the candidate text and feature data of the image modality, feature data of the sound modality and feature data of the existing text, and superimpose the three bidirectional attention data together to obtain cross-attention data of the candidate text. The second text attention processing unit may be configured to calculate bidirectional attention data between the feature data of the existing text and the feature data of the candidate text, the feature data of the image modality and the feature data of the sound modality, and superimpose the three bidirectional attention data to obtain cross-attention data of the existing text. The image attention processing unit may be configured to calculate bidirectional attention data between the feature data of an image modality and the feature data of the sound modality, feature data of the candidate text, the feature data of the existing text, and superimpose the three bidirectional attention data to obtain cross-attention data of the image modality. The sound attention processing unit may be configured to calculate bidirectional attention data between the feature data of the sound modality and the feature data of the image mode, the feature data of the candidate text, the feature data of the existing text, and superimpose the two bidirectional attention data to obtain the cross attention data of the sound modality.

It should be noted that, among the encoding units and the attention processing units as described above, some special attention processing models may be selected as the attention processing units corresponding to the respective modalities according to different data types of the respective modalities, and some special encoding models may be selected as the encoding units corresponding to the respective modality data types, so that better feature encoding and information fusing may be achieved. In addition, in view of the universality of the machine learning model, it is also feasible to use some common machine learning model structures for feature encoding and attention calculating processing for each modality and candidate text.

Figure 4:
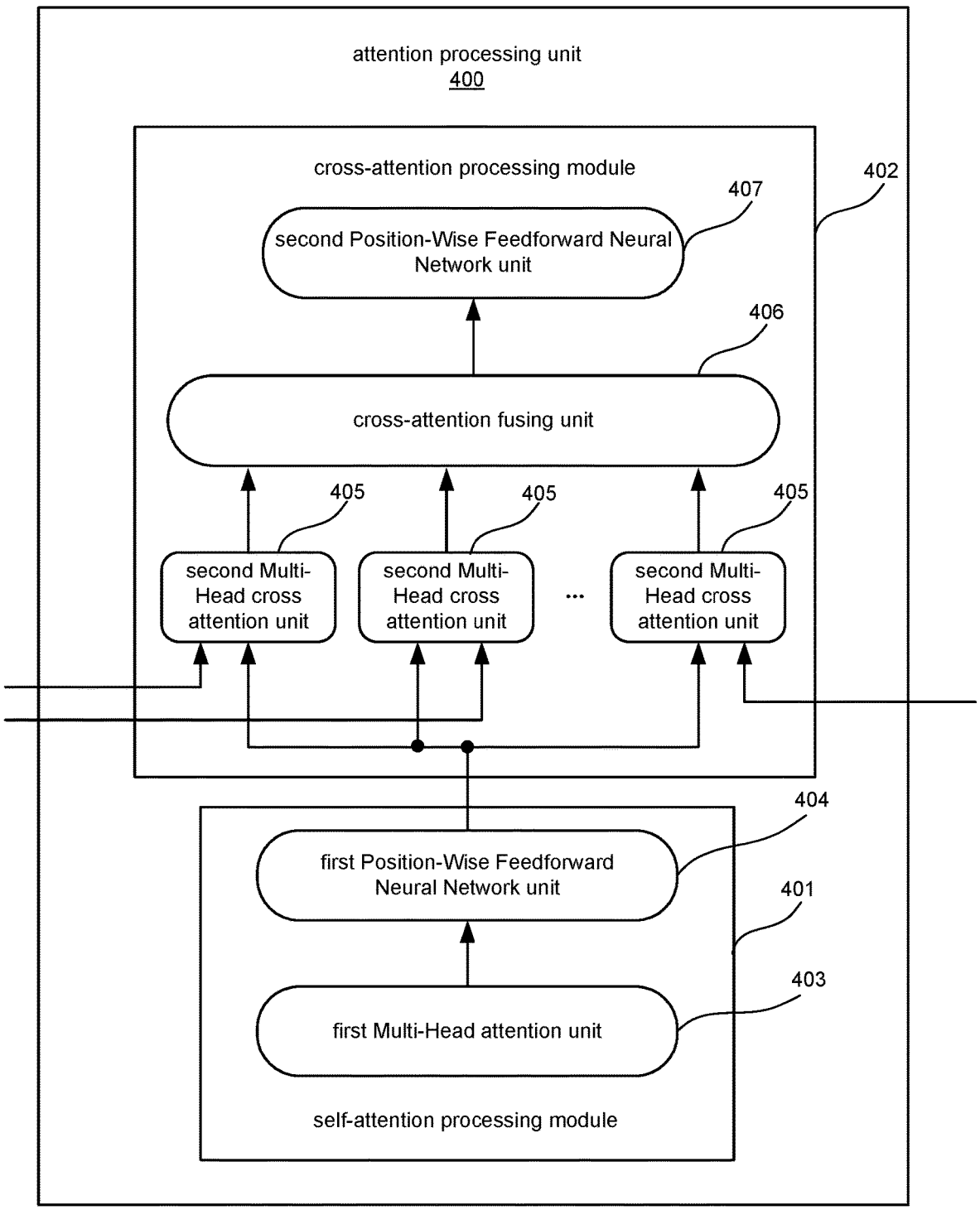
FIG. 4 is a block diagram showing an example of attention processing units in a matching layer according to an embodiment of the present disclosure.

As shown in FIG. 4, it describes a specific implementation structure of the attention processing units shown in FIG. 3, which is applicable to the attention processing units corresponding to each modality and the processing units corresponding to the candidate text shown in FIG. 3.

As shown in FIG. 4, it is a block diagram showing a detailed structure of each attention processing unit in the matching layer according to the embodiment of the present invention. In the attention processing units shown in the block diagram 400, the internal implementation structure of the self-attention processing module 401 and the cross attention processing module 402 is further illustrated in the block diagram 400.

The self-attention processing module 401 may include a first Multi-Head attention unit 403 and a first Position-Wise Feedforward Neural Network (FNN) unit 404, which are sequentially connected.

The first Multi-Head attention unit 403 may be configured to generate a first Multi-Head attention intermediate data after performing a Multi-Head attention processing on the feature data of the current modality or the feature data corresponding to the candidate text.

The first Position-Wise Feedforward Neural Network unit 404 may be configured to perform context relationship processing on the first Multi-Head attention intermediate data and generate self-attention data corresponding to the current modality.

The self-attention data generated through the processing on the feature data of each modality in the video by the self-attention processing module 401 may include the self-attention weight information of the current modality, and further contain the context information of the current modality. After being processed by the self-attention processing module 401, the feature data corresponding to the candidate text may include the self-attention weight information of each segmented word in the candidate text, and the context relationship information of each segmented word in the candidate text.

The cross-attention processing module 402 may include a plurality of second Multi-Head cross attention units 405 corresponding to each modality and candidate texts, a cross attention fusing unit 406, and a second Position-Wise Feedforward Neural Network unit 407.

Each second Multi-Head cross attention unit 405 may be configured to perform an Multi-Head cross attention processing on the self-attention data of the current attention processing unit 400 and the self-attention data of the other modalities and/or the self-attention data of the candidate text, generating a plurality of second Multi-Head attention intermediate data. That is to say, each of the second Multi-Head cross attention unit 405 may perform a Multi-Head cross attention processing on the self-attention data on two paths, to implement cross attention calculation among all self-attention data with the cooperation processing by a plurality of second Multi-Head cross attention units 405. For example, if the current attention processing unit 400 is used to process the feature data of the image modality in the video segment, a cross attention calculation may be performed on the self-attention data of the image modality and the self-attention data of the audio modality, the existing subtitle modality, and the candidate text modality (these self-attention data are from the self-attention processing modules 401 in other attention processing units 400) by the plurality of second Multi-Head cross attention units 405. Similarly, if the current attention processing unit 400 is used to process the feature data of the candidate text, the cross attention calculation may be performed on the self-attention data of the candidate text and the self-attention data of the video modality, audio modality and the existing subtitle modality by the plurality of second Multi-Head cross attention units 405. The ends of the arrow lines extending beyond the attention processing unit 400 in the figure indicates the input of the self-attention data from other attention processing units.

The cross-attention fusing unit 406 may be configured to perform a fusing processing on the plurality of second Multi-Head attention intermediate data, to generate a fused third Multi-Head attention intermediate data. The amount of the plurality of second Multi-Head attentions obtained after the processing by the second Multi-Head attention unit 405 may be the amount of modalities of the video segment. For example, if a video segment contains three modalities of image, audio, and existing subtitles, and the current attention processing unit 400 corresponds to the modality of the image, the second Multi-Head cross attention unit 405 may perform a cross attention processing on the self-attention data of the image modality with the self-attention data corresponding to the audio, the existing subtitles, and the candidate text, respectively, so that second Multi-Head attention intermediate data of three paths may be formed. Then, the cross-attention fusing unit 406 may fuse the second Multi-Head attention intermediate data of three paths into a third Multi-Head attention intermediate data of one path. The third Multi-Head attention intermediate data may indicate the feature of the image modality, and attention weight feature of other modalities and the candidate texts may be fused in such third Multi-Head attention intermediate data.

The second Position-Wise Feedforward Neural Network unit 407 may be configured to perform context processing on the third Multi-Head attention intermediate data to generate cross attention data.

The self-attention data generated through the processing on the feature data of each modality in the video by the cross-attention processing module 402 may include the cross-attention weight information between the current modality and other modalities and the candidate text, and further contain the context information of the current modality. After being processed by the cross-attention processing module 402, the feature data corresponding to the candidate text may include the cross-attention weight information between each segmented word in the candidate text and each of other modalities, and further contain the context relationship information of each segmented word in the candidate text.

Description has been made on the examples of the structure of each attention processing unit in the matching layer above, and then the description would be made on the training manner of the entire matching model 106 below.

In the training of the machine learning model, the above matching model 106 may perform training by using the existing videos with abundant live comments. More particularly, some live comments of high quality may be selected from the existing video as the training data for the candidate text, or the training text manually selected or created may be used as the training data for the candidate text.

In a specific training manner, a training video file may be split into a plurality of training video segments, and the text of live comments in the training video file may be extracted. Then, a positive training sample and a negative training sample may be generated according to the time range during which the timestamp information of the text of live comments is corresponding to the training video segment. More particularly, the positive training sample may be a training sample in which the training video segment is combined with the text of live comments whose timestamps are within the time range corresponding to the training video segment, and the negative training sample may be a training sample in which the training video segment is combined with the text of live comments whose timestamps are outside of the time range corresponding to the training video segment. The main target of training is to continuously improve the accuracy in determining by the machine learning model on the similarity between the video segment and the candidate texts.

After the training on the matching model with a large amount of existing videos, the trained matching model may be adapted to a wider range of candidate texts.

In some cases, the obtained candidate text may be not matched with the video segment well. If the live comments generated by the live comment generating device as shown in FIG. 1 to FIG. 4 are less or of bad quality, a live comment generating model as shown in FIG. 5 may be used, so as to generate some new live comments in another live comment generating mechanism.

Figure 5:
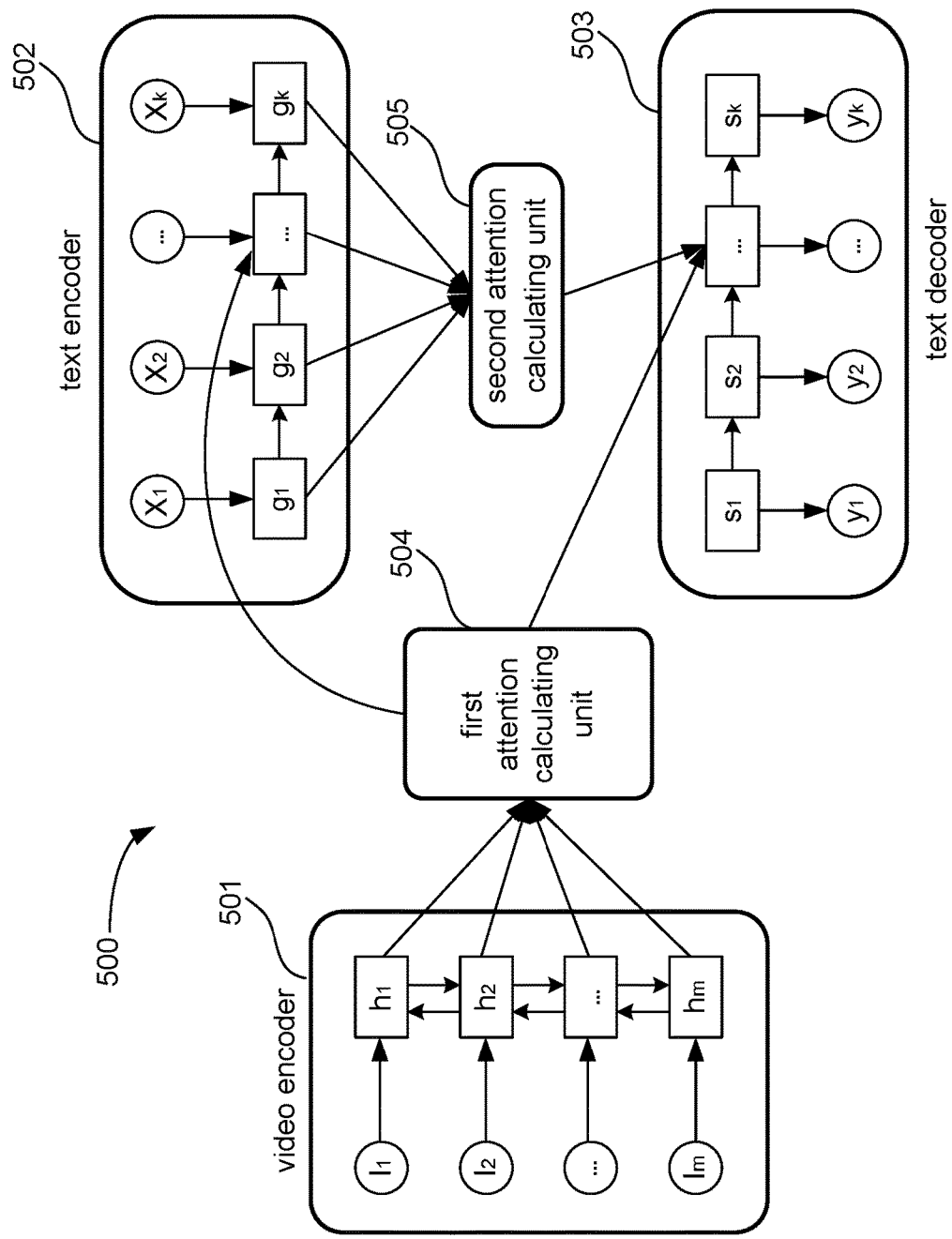
FIG. 5 is a block diagram showing an example of a live comment generating apparatus according to another embodiment of the present disclosure.

As shown in FIG. 5, it is a structural block diagram 500 showing an example of a live comment generating device 500 according to an embodiment of the present disclosure. The live comment generating device 500 as shown in FIG. 5 may generate new live comments by using the image information of the video segment and some of the existing live comment information (which may be a small amount of live comments) of the video segment, thereby making the live comments of the video richer. The live comment generating device 500 may include a video encoder 501, a text encoder 502, a text decoder 503, a first attention calculating unit 504, and a second attention calculating unit 505.

The video encoder 501 may be configured to acquire a plurality of first frame feature vectors corresponding to the images of a plurality of frames in a video segment. More particularly, the video encoder 501 may acquire a plurality of first frame feature vectors corresponding to the images of the plurality of frames in the video segment, and perform context relationship processing on the first frame feature vectors to generate a plurality of first frame feature vectors containing the context relationship. As shown in FIG. 5, the video encoder 501 may perform feature encoding on the m frame images in the video segment by using a CNN (Convolutional Neural Network) layer to generate m first frame feature vectors I1 to Im corresponding to the m frame images. Then, a context relationship processing may be performed on the first frame feature vectors by using the LSTM (Long Term and Short Term Memory Network) layer, to obtain m first frame feature vectors h1 to hm containing the context relationship.

The text encoder 502 may be configured to acquire a plurality of first live comment feature vectors corresponding to a plurality of existing live comments in the video segment. More particularly, the text encoder 502 may acquire a plurality of first live comment feature vectors corresponding to the plurality of existing live comments in the video segment, and perform context relationship processing on the plurality of first live comment feature vectors to generate a plurality of first live comment feature vectors containing the context relationship. As shown in FIG. 5, k pieces of existing live comments may be obtained, and feature coding processing may be performed on each existing live comment to form a plurality of first live comment feature vectors X1 to Xk. The context relationship processing may be performed on the plurality of first live comment feature vectors to generate a plurality of first live comment feature vectors g1 to gk containing context relationships.

The first attention calculating unit 503 may be configured to calculate a first attention vector of each first live comment feature vector with respect to the plurality of first frame feature vectors, as a second live comment feature vector corresponding to each existing live comment. In the embodiments of the present disclosure, the first attention calculating unit 504 may also be used as a part of the text encoder 502, and is mainly used to integrate the attention weight information of the image of each frame in the video segment into the feature vector representation of each existing live comments through the attention calculating process, so that the output second live comment feature vector may be used as the feature information representation of the existing live comments which have been fused with the images of the video.

The text decoder 504 may be configured to generate a plurality of output word vectors of a new live comment according to the plurality of second live comment feature vectors, and further decode the plurality of output word vectors and output a new live comment.

Furthermore, the live comment generating device 500 may further include a second attention calculating unit 505, which may be configured to cooperate with the text decoder 504 to predict a plurality of subsequent output word vectors according to the context relationship based on a given word vector as an initial output word vector of the new live comment, and calculate an initial output word vector and a plurality of subsequent output word vectors, as the output word vectors of the new live comments with respect to each of the first frame feature vector and the second attention vector of each second live comment feature vector. The second attention calculating unit 505 may alternatively be a part of the text decoder 504.

More particularly, a new live comment may generally correspond to a plurality of word vectors, i.e., the plurality of output word vectors described above, and each of the output word vectors may correspond to a segmented word in the new live comment. There is a context relationship between the output word vectors of the new live comment. Generally, the word vector corresponding to the latter segmented word may be generated based on the word vector of the previous segmented word. Therefore, in order to implement the predicting processing of the output word vector, a preset word vector may be used as an initial output word vector (for example, S1 in FIG. 5), so that the predicting processing of the subsequent output word vector may be performed. The given word vector may be randomly assigned with value or be a vector with a value of 0 for each element in the vector. Upon the initial output word vector is given, the second attention calculating unit 505 may predict a plurality of subsequent output word vectors (for example, S2 to Sk in FIG. 5) according to the context relationship based on the initial output word vector, and calculate an initial output word vector and a plurality of subsequent output word vectors, which may be used as the output word vectors of the new live comment (corresponding to y1 to yk in FIG. 5), with respect to each of the first frame feature vector and the second attention vector of each second live comment feature vector. Upon the final output word vector is obtained, decoding processing may be performed on each output word vector to form each segmented word of the new live comment.

In the training of the model as shown in FIG. 5, an image of each frame in the training video segment may be extracted from a video with abundant live comments as the input training data of the video encoder 501, and the texts of the live comments corresponding to the training video segment may be extracted. Texts of some of such live comments may be calibrated as the correct output results of the text decoder 503 (it is feasible to select the text of only one live comment as the output result), and Texts of another part of such live comments may be used as the input training data to the text encoder 502 for the training of the model, so that the live comment generating model shown in FIG. 5 may be generated. The above training is mainly used to continuously improve the machine learning model's ability to generate new live comments based on the image information in the video segment and the existing live comments in the video segment.

Detailed description has been made on the live comment generating device according to the embodiment of the present disclosure above, and the functions performed by the above-described live comment generating device may be implemented as a matching processing method of video and comment described below.

Explanatory Process

Figure 6:
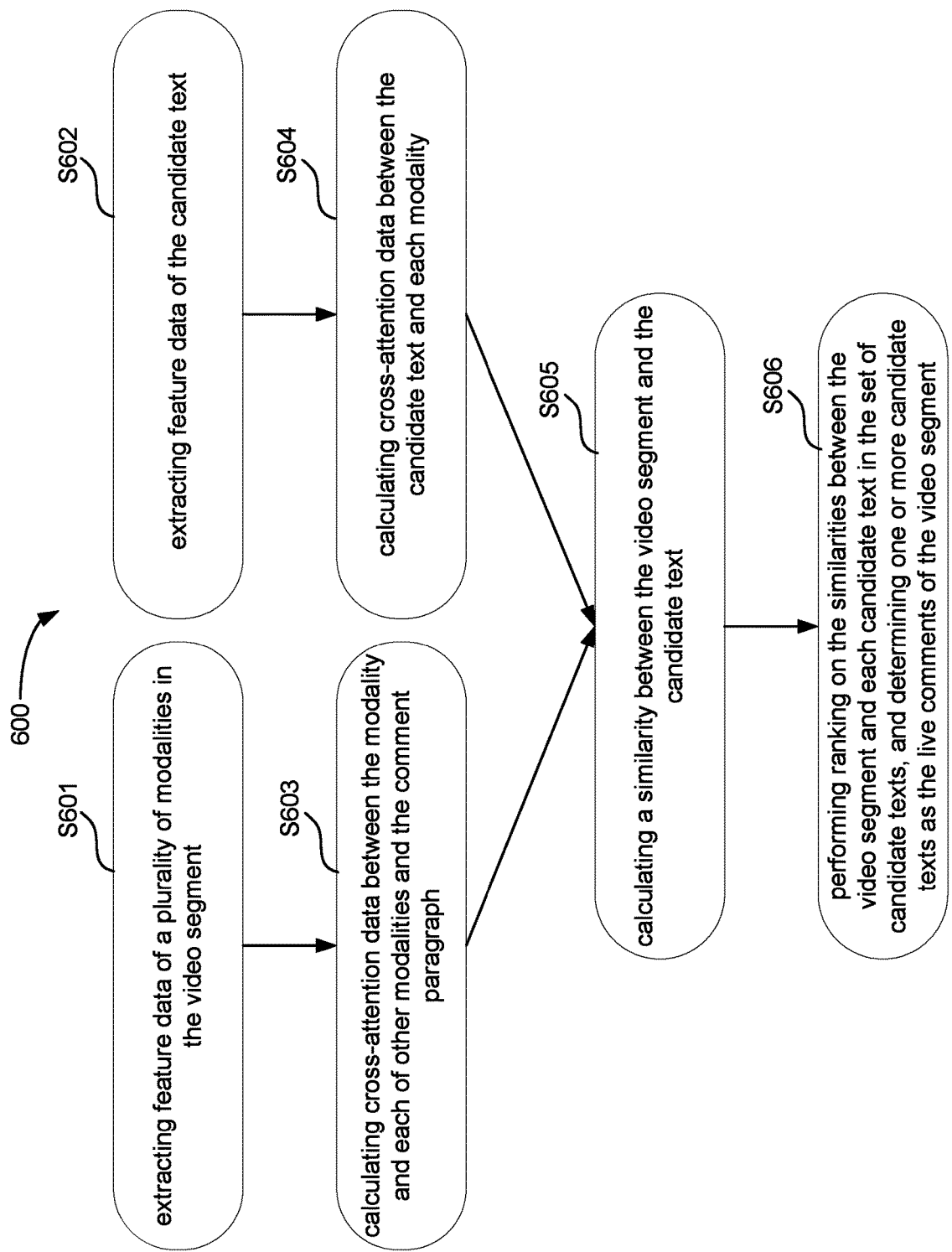
FIG. 6 is a schematic flowchart showing a live comment generating method according to an embodiment of the present disclosure.

As shown in FIG. 6, it is a schematic flowchart 600 for describing one of the illustrative processes of the live comment generating method according to the embodiments of the present disclosure. Before performing the processing shown in FIG. 6, a relatively large video may be split into a plurality of video segments and the candidate texts may be ready. As described above, some comment information may be extracted as candidate texts from some social media websites, social APPs, movie review APPs, and the like, and a set of candidate texts may be formed. Then, the following processing may be started.

First, the processing of steps S601 to S605 may be performed on each candidate text in the video segment and the set of candidate texts.

S601: extracting feature data of a plurality of modalities in the video segment.

S602: extracting feature data of the candidate text.

S603: calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph.

S604: calculating the bidirectional attention data between the feature data of the candidate text and the feature data of each modality with respect to the candidate text and superimposing the plurality of bidirectional attention data together to obtain cross-attention data between the candidate text and each modality S605: calculating a similarity between the video segment and the candidate text according to each cross-attention data of each modality of the video segment and the cross-attention data of the candidate text.

Upon obtaining the similarity between each candidate text in the set of candidate texts and the video segment by calculation, step S606 may be performed.

S606: performing ranking on the similarities between the video segment and each candidate text in the set of candidate texts, and determining one or more candidate texts as the live comments of the video segment according to the ranking result of the similarities.

More particularly, the above steps S603 and S604 may further include: performing self-attention calculation processing on the feature data of each modality and the feature data of the candidate text, and generating self-attention data of each modality and self-attention data of the candidate text; calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts; calculating bidirectional attention data between the self-attention data of the candidate text and the self-attention data of each modality with respect to the candidate text, and superimposing the plurality of bidirectional attention data together, to obtain cross-attention data between the candidate text and each modality.

In the processing of the above steps S603 and S604, a plurality of feature vectors included in the feature data may be first fused according to self-attention weights through a self-attention calculating processing, and self-attention data representing the information of current modality or information of candidate text may be generated. The self-attention data may exist in a form of attention vectors. Then, a cross-attention processing may be performed on the self-attention data corresponding to each modality and the candidate text, so that the information of the modality and the candidate text are fused according to attention weights, to form cross-attention data containing the correlation between each modality and candidate texts, which may exist in a form of attention vectors.

Furthermore, the step S605 described above may further include the following steps.

S6051: performing pooling processing on the cross-attention data of each modality and the cross-attention data of the candidate text to generate a corresponding pooled attention vector. The pooling processing may be used to decrease the feature dimensions and avoid over-fitting, so as to facilitate the fusing on the feature data of various modalities and the subsequent calculation on similarity.

S6052: fusing the pooled attention vector corresponding to each modality to generate a fusion attention vector corresponding to the video segment. More particularly, such fused attention vector may be used in subsequent similarity calculation as the vector of the entire video segment.

S6053: calculating the similarity between the fusion attention vector corresponding to the video segment and the pooled attention vector corresponding to the candidate text as the similarity between the video segment and the candidate text.

In addition, the pooling process of the above-described step of S6051 may be omitted, that is, the cross-attention data corresponding to each modality may be fused to generate the fusion attention vector corresponding to the video segment in the above step of S6052. Correspondingly, in step of S6053, the similarity between the fusion attention vector corresponding to the video segment and the cross-attention data corresponding to the candidate text may be calculated as the similarity between the video segment and the candidate text.

Figure 7:
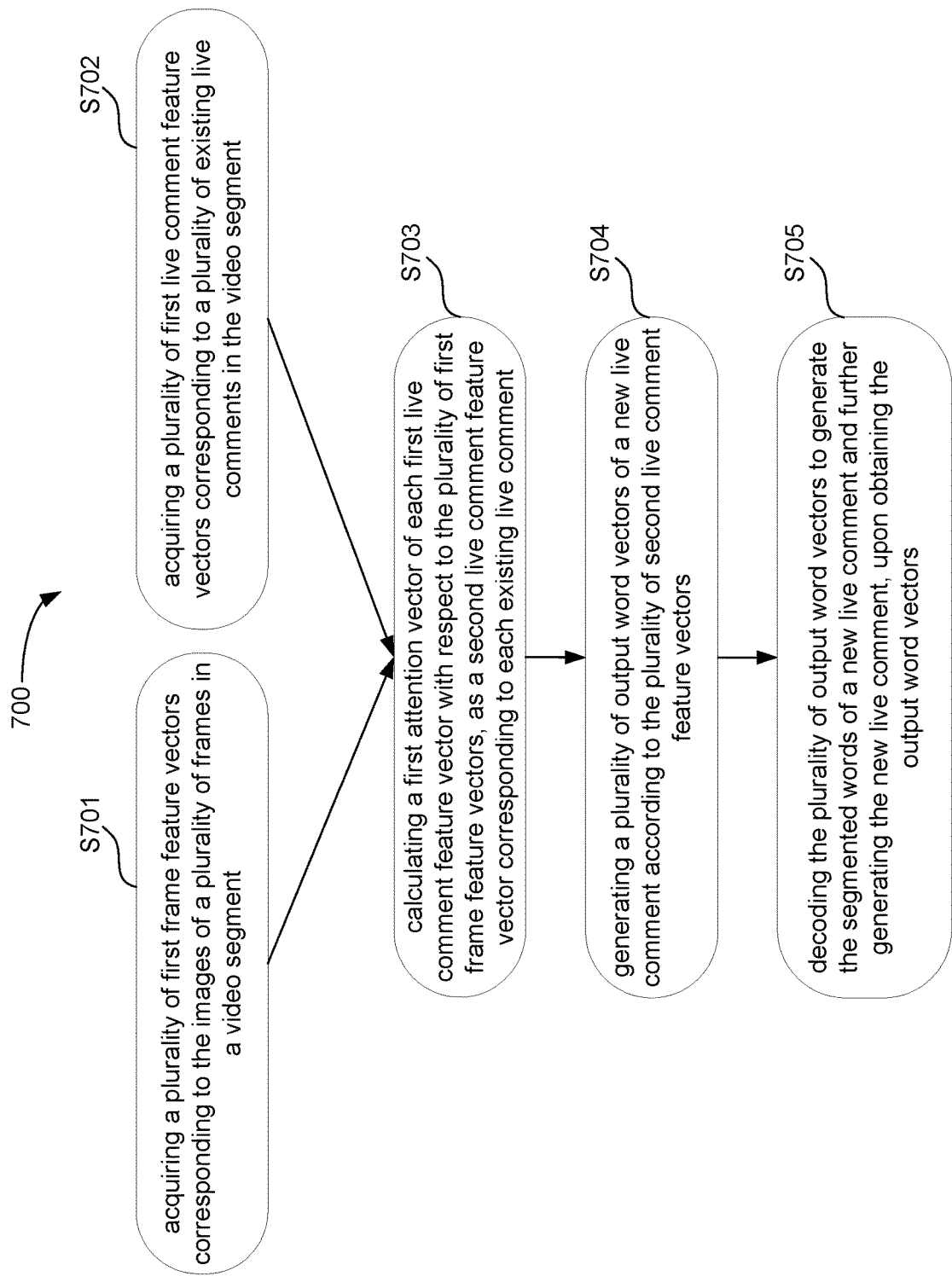
FIG. 7 is a schematic flowchart showing a live comment generating method according to another embodiment of the present disclosure.

In some cases, the obtained candidate text may be not matched with the video segment well, or the generated live comments are less or of bad quality, a live comment generating method as shown in FIG. 7 may be used, so as to generate some new live comments in another live comment generating mechanism. As shown in FIG. 7, it is a schematic flowchart 700 showing the illustrative processing of the live comment generating method according to the embodiments of the present disclosure. The live comment generating method may include the following steps.

S701: acquiring a plurality of first frame feature vectors corresponding to the images of a plurality of frames in a video segment. More particularly, the step of S701 may include: acquiring a plurality of first frame feature vectors corresponding to the images of the plurality of frames in the video segment, and performing context relationship processing on the first frame feature vectors to generate a plurality of first frame feature vectors containing the context relationship.

S702: acquiring a plurality of first live comment feature vectors corresponding to a plurality of existing live comments in the video segment. More particularly, the step of S702 may include: acquiring a plurality of first live comment feature vectors corresponding to the plurality of existing live comments in the video segment, and performing context relationship processing on the plurality of first live comment feature vectors to generate a plurality of first live comment feature vectors containing the context relationship.

S703: calculating a first attention vector of each first live comment feature vector with respect to the plurality of first frame feature vectors, as a second live comment feature vector corresponding to each existing live comment.

S704: generating a plurality of output word vectors of a new live comment according to the plurality of second live comment feature vectors. More particularly, the step of S704 may include: predicting a plurality of subsequent output word vectors according to the context relationship based on a given word vector as an initial output word vector of the new live comment, and calculating an initial output word vector and a plurality of subsequent output word vectors, as the output word vectors of the new live comments with respect to each of the first frame feature vector and the second attention vector of each second live comment feature vector.

S705: decoding the plurality of output word vectors to generate the segmented words of a new live comment and further generating the new live comment, upon obtaining the output word vectors.

It should be noted that the foregoing method for generating a barrage can be implemented based on the above-described live comment generating device, wherein the flow shown in FIG. 6 can be through the block diagram of the live comment generating device shown in FIG. 1 to FIG. To achieve this, the flow shown in FIG. 7 can be realized by the block diagram of the related structure of the live comment generating device shown in FIG. 5. On the other hand, it can also be implemented independently as a method flow, or by other software or hardware design, under the inventive idea of the embodiment of the present invention.

The various processes of the barrage generation method in the embodiment of the present invention are described above. The technical details and the corresponding technical effects are described in detail in the previous introduction to the live comment generating device, and are not described herein again.

Implementation Example of Electronic Apparatus

The electronic apparatus according to embodiments of the present disclosure may be a mobile electronic apparatus, or an electronic apparatus with less mobility or a stationary computing apparatus. The electronic apparatus according to embodiments of the present disclosure may at least include a processor and a memory. The memory may store instructions thereon and the processor may obtain instructions from the memory and execute the instructions to cause the electronic apparatus to perform operations.

In some examples, one or more components or modules and one or more steps as shown in FIG. 1 to FIG. 7 may be implemented by software, hardware, or in combination of software and hardware. For example, the above component or module and one or more steps may be implemented in system on chip (SoC). Soc may include: integrated circuit chip, including one or more of processing unit (such as center processing unit (CPU), micro controller, micro processing unit, digital signal processing unit (DSP) or the like), memory, one or more communication interface, and/or other circuit for performing its function and alternative embedded firmware.

Figure 8:
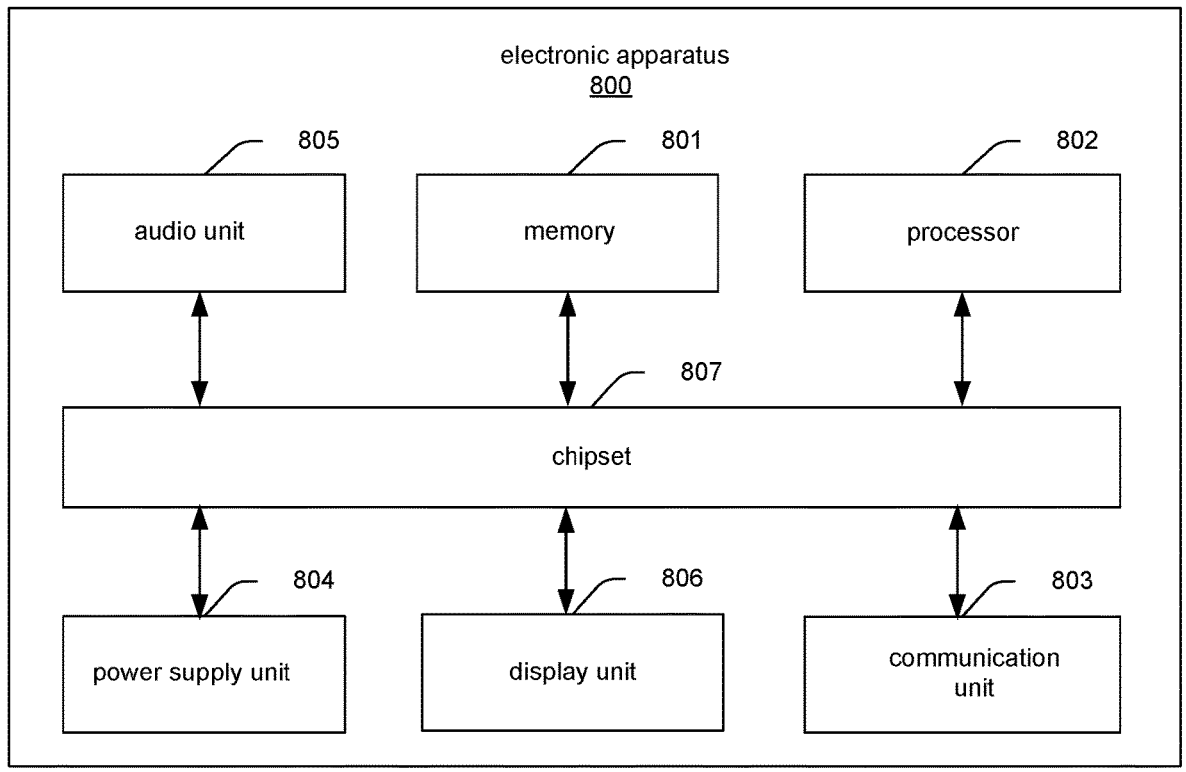
FIG. 8 is a structural block diagram showing an exemplary mobile electronic apparatus.

As shown in FIG. 8, which is a structural block diagram of an exemplary mobile electronic apparatus 800. The electronic apparatus 800 may be a small portable (or mobile) electronic apparatus. The small portable (or mobile) electronic apparatus may be e.g., a cell phone, a personal digital assistant (PDA), a personal media player device, a wireless network player device, personal headset device, an IoT (internet of things) intelligent device, a dedicate device or combined device containing any of functions described above. The electronic apparatus 800 may at least include a memory 801 and a processor 802.

The memory 801 may be configured to store programs. In addition to the above programs, the memory 801 may be configured to store other data to support operations on the electronic apparatus 800. The examples of these data may include instructions of any applications or methods operated on the electronic apparatus 800, contact data, phone book data, messages, pictures, videos, and the like.

The memory 801 may be implemented by any kind of volatile or nonvolatile storage device or their combinations, such as static random access memory (SRAM), electronically erasable programmable read-only memory (EEPROM), erasable programmable read-only memory (EPROM), programmable read-only memory (PROM), read-only memory (ROM), magnetic memory, flash memory, disk memory, or optical disk.

The memory 801 may be coupled to the processor 802 and contain instructions stored thereon. The instructions may cause the electronic apparatus 800 to perform operations upon being executed by the processor 802, the operations may include: implement the related processing procedures performed in the corresponding examples shown in FIG. 6 to FIG. 8, or processing logics performed by the apparatus, system, and user interface shown in FIG. 1 to FIG. 5.

More particularly, the operations described above may include the following processing on the video segment and each candidate text in a set of candidate texts:

Extracting feature data of a plurality of modalities in the video segment and extracting feature data of the candidate text.

Calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph.

Calculating the bidirectional attention data between the feature data of the candidate text and the feature data of each modality with respect to the candidate text and superimposing the plurality of bidirectional attention data together to obtain cross-attention data between the candidate text and each modality.

Calculating a similarity between the video segment and the candidate text according to each cross-attention data of each modality of the video segment and the cross-attention data of the candidate text.

Performing ranking on the similarities between the video segment and each candidate text in the set of candidate texts, and determining one or more candidate texts as the live comments of the video segment according to the ranking result of the similarities.

More particularly, the processing of calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, and calculating the bidirectional attention data between the feature data of the candidate text and the feature data of each modality with respect to the candidate text and superimposing the plurality of bidirectional attention data together to obtain cross-attention data between the candidate text and each modality may further include:

performing self-attention calculation processing on the feature data of each modality and the feature data of the candidate text, and generating self-attention data of each modality and self-attention data of the candidate text;

calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts;

calculating bidirectional attention data between the self-attention data of the candidate text and the self-attention data of each modality with respect to the candidate text, and superimposing the plurality of bidirectional attention data together, to obtain cross-attention data between the candidate text and each modality.

More particularly, the operations described above may further include the following processing.

acquiring a plurality of first frame feature vectors corresponding to the images of a plurality of frames in a video segment.

acquiring a plurality of first live comment feature vectors corresponding to a plurality of existing live comments in the video segment.

calculating a first attention vector of each first live comment feature vector with respect to the plurality of first frame feature vectors, as a second live comment feature vector corresponding to each existing live comment.

generating a plurality of output word vectors of a new live comment according to the plurality of second live comment feature vectors.

More particularly, the generating a plurality of output word vectors of a new live comment according to the plurality of second live comment feature vectors may include: predicting a plurality of subsequent output word vectors according to the context relationship based on a given word vector as an initial output word vector of the new live comment, and calculating an initial output word vector and a plurality of subsequent output word vectors, as the output word vectors of the new live comments with respect to each of the first frame feature vector and the second attention vector of each second live comment feature vector.

Detailed description has been made on the above operations in the above embodiments of method and device. The description on the above operations may be applied to electronic apparatus 800. That is to say, the specific operations mentioned in the above embodiments may be recorded in memory 801 in program and be performed by processor 802.

Furthermore, as shown in FIG. 8, the electronic apparatus 800 may further include: a communication unit 803, a power supply unit 804, an audio unit 805, a display unit 806, chipset 807, and other units. Only part of units are exemplarily shown in FIG. 8 and it is obvious to one skilled in the art that the electronic apparatus 800 only includes the units shown in FIG. 8.

The communication unit 803 may be configured to facilitate wireless or wired communication between the electronic apparatus 800 and other apparatuses. The electronic apparatus may be connected to wireless network based on communication standard, such as WiFi, 2G, 3G, or their combination. In an exemplary example, the communication unit 803 may receive radio signal or radio related information from external radio management system via radio channel. In an exemplary example, the communication unit 803 may further include near field communication (NFC) module for facilitating short-range communication. For example, the NFC module may be implemented with radio frequency identification (RFID) technology, Infrared data association (IrDA) technology, ultra wideband (UWB) technology, Bluetooth (BT) technology and other technologies.

The power supply unit 804 may be configured to supply power to various units of the electronic device. The power supply unit 804 may include a power supply management system, one or more power supplies, and other units related to power generation, management, and allocation.

The audio unit 805 may be configured to output and/or input audio signals. For example, the audio unit 805 may include a microphone (MIC). When the electronic apparatus in an operation mode, such as calling mode, recording mode, and voice recognition mode, the MIC may be configured to receive external audio signals. The received audio signals may be further stored in the memory 801 or sent via the communication unit 803. In some examples, the audio unit 805 may further include a speaker configured to output audio signals.

The display unit 806 may include a screen, which may include liquid crystal display (LCD) and touch panel (TP). If the screen includes a touch panel, the screen may be implemented as touch screen so as to receive input signal from users. The touch panel may include a plurality of touch sensors to sense touching, sliding, and gestures on the touch panel. The touch sensor may not only sense edges of touching or sliding actions, but also sense period and pressure related to the touching or sliding operations.

The above memory 801, processor 802, communication unit 803, power supply unit 804, audio unit 805 and display unit 806 may be connected with the chipset 807. The chipset 807 may provide interface between the processor 802 and other units of the electronic apparatus 800. Furthermore, the chipset 807 may provide interface for each unit of the electronic apparatus 800 to access the memory 801 and communication interface for accessing among units.

In some examples, one or more modules, one or more steps, or one or more processing procedures involved in FIGS. 1 to 7 may be implemented by a computing device with an operating system and hardware configuration.

Figure 9:
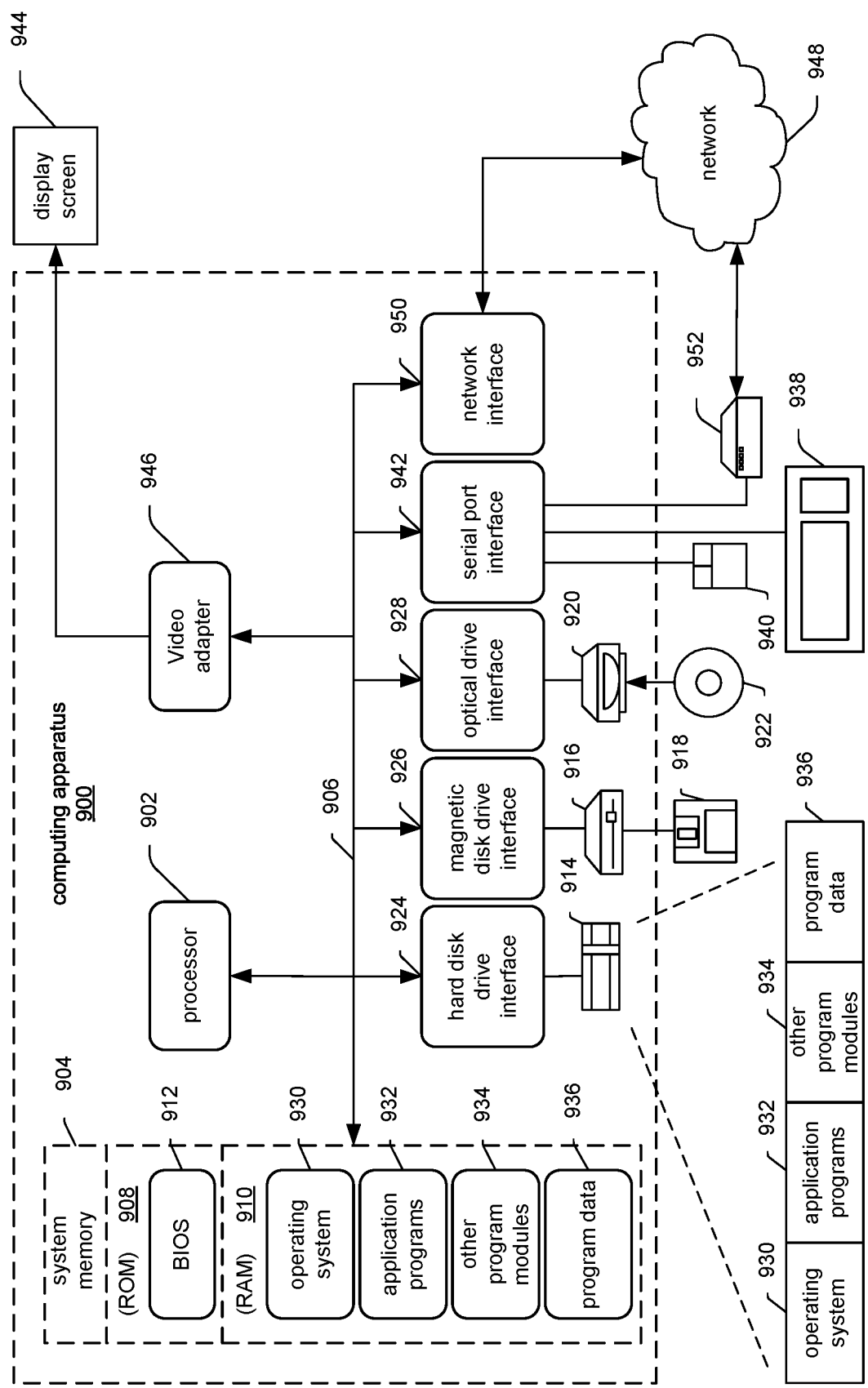
FIG. 9 is a structural block diagram showing an exemplary computing apparatus.

FIG. 9 is a structural block diagram of an exemplary computing apparatus 900. The description of computing apparatus 900 provided herein is provided for purposes of illustration, and is not intended to be limiting. Embodiments may be implemented in further types of computer systems, as would be known to persons skilled in the relevant art(s).

As shown in FIG. 9, the computing apparatus 900 includes one or more processors 902, a system memory 904, and a bus 906 that couples various system components including system memory 904 to processor 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908, and random access memory (RAM) 910. A basic input/output system 912 (BIOS) is stored in ROM 908.

The computing apparatus 900 also has one or more of the following drives: a hard disk drive 910 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 910, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, RAMs, ROMs, and the like.

A number of program modules may be stored on the hard disk, magnetic disk, optical disk, ROM, or RAM. These programs include an operating system 930, one or more application programs 932, other program modules 934, and program data 936. These programs may include, for example, computer program logic (e.g., computer program code or instructions) for implementing processing procedures performed in the corresponding examples shown in FIG. 6 to FIG. 7, or processing logics performed by the TTS processing device shown in FIG. 1 to FIG. 5.

A user may enter commands and information into computing apparatus 900 through input devices such as a keyboard 938 and a pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices may be connected to processor 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing apparatus 900. Display screen 944 may display information, as well as being a user interface for receiving user commands and/or other information (e.g., by touch, finger gestures, virtual keyboard, etc.). In addition to display screen 944, the computing apparatus 900 may include other peripheral output devices (not shown) such as speakers and printers.

The computing apparatus 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium" are used to generally refer to media such as the hard disk associated with hard disk drive 910, removable magnetic disk 918, removable optical disk 922, system memory 904, flash memory cards, digital video disks, RAMs, ROMs, and further types of physical/tangible storage media. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable computing apparatus 900 to implement features of embodiments discussed herein. Accordingly, such computer programs represent controllers of the computing apparatus 900.

As such, embodiments are also directed to computer program products including computer instructions/code stored on any computer useable storage medium. Such code/instructions, when executed in one or more data processing devices, causes a data processing device(s) to operate as described herein. Examples of computer-readable storage devices that may include computer readable storage media include storage devices such as RAM, hard drives, floppy disk drives, CD ROM drives, DVD ROM drives, zip disk drives, tape drives, magnetic storage device drives, optical storage device drives, MEMs devices, nanotechnology-based storage devices, and further types of physical/tangible computer readable storage devices.

Example Clauses

A. A method including:
  extracting feature data of a plurality of modalities in the video segment and extracting feature data of the candidate text, with respect to a video segment and each candidate text in a set of candidate texts;
  calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, with respect to a video segment and each candidate text in a set of candidate texts;
  calculating bidirectional attention data between the feature data of the candidate text and the feature data of each modality with respect to the candidate text and superimposing the plurality of bidirectional attention data together to obtain cross-attention data between the candidate text and each modality, with respect to a video segment and each candidate text in a set of candidate texts;
  calculating a similarity between the video segment and the candidate text according to each cross-attention data of each modality of the video segment and the cross-attention data of the candidate text, with respect to a video segment and each candidate text in a set of candidate texts; and
  performing ranking on the similarities between the video segment and each candidate text in the set of candidate texts, and determining one or more candidate texts as the live comments of the video segment according to the ranking result of the similarities.

B. The method according to paragraph A, wherein
  the processing of calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, and the calculating bidirectional attention data between the feature data of the candidate text and the feature data of each modality with respect to the candidate text and superimposing the plurality of bidirectional attention data together to obtain cross-attention data between the candidate text and each modality further includes:
  performing self-attention calculation processing on the feature data of each modality and the feature data of the candidate text, and generating self-attention data of each modality and self-attention data of the candidate text;
  calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts;
  calculating bidirectional attention data between the self-attention data of the candidate text and the self-attention data of each modality with respect to the candidate text, and superimposing the plurality of bidirectional attention data together, to obtain cross-attention data between the candidate text and each modality.

C. The method according to paragraph A, wherein the calculating a similarity between the video segment and the candidate text according to each cross-attention data of each modality of the video segment and the cross-attention data of the candidate text includes:
  fusing the cross-attention data corresponding to each modality to generate a fusion attention vector corresponding to the video segment; and
  calculating a similarity between the fusion attention vector corresponding to the video segment and the cross-attention data corresponding to the candidate text, as the similarity between the video segment and the candidate text.

D. The method according to paragraph A, wherein the plurality of modalities include an image modality, a sound modality, or an image modality, a sound modality, and an existing text modality.

E. The method according to paragraph A, further including:
  acquiring a plurality of first frame feature vectors corresponding to images of a plurality of frames in a video segment;
  acquiring a plurality of first live comment feature vectors corresponding to a plurality of existing live comments in the video segment;
  calculating a first attention vector of each first live comment feature vector with respect to the plurality of first frame feature vectors, as a second live comment feature vector corresponding to each existing live comment;

generating a plurality of output word vectors of a new live comment according to the plurality of second live comment feature vectors.

F. The method according to paragraph E, wherein the generating a plurality of output word vectors of a new live comment according to the plurality of second live comment feature vectors includes:

predicting a plurality of subsequent output word vectors according to the context relationship based on a given word vector as an initial output word vector of the new live comment, and calculating an initial output word vector and a plurality of subsequent output word vectors, as the output word vectors of the new live comments with respect to each of the first frame feature vector and the second attention vector of each second live comment feature vector.

G. The method according to paragraph E, wherein the acquiring a plurality of first frame feature vectors corresponding to images of a plurality of frames in a video segment includes:

acquiring a plurality of first frame feature vectors corresponding to the images of the plurality of frames in the video segment, and performing context relationship processing on the first frame feature vectors to generate a plurality of first frame feature vectors containing the context relationship.

H. The method according to paragraph E, wherein the acquiring a plurality of first live comment feature vectors corresponding to a plurality of existing live comments in the video segment includes:

acquiring a plurality of first live comment feature vectors corresponding to the plurality of existing live comments in the video segment, and performing context relationship processing on the plurality of first live comment feature vectors to generate a plurality of first live comment feature vectors containing the context relationship.

I. A device including:

a feature extracting layer, configured to extract feature data of a plurality of modalities in a video segment and extract feature data of a candidate text;

a multi-modality cross-matching layer configured to perform the following processing:

calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph;

calculating bidirectional attention data between the feature data of the candidate text and the feature data of each modality with respect to the candidate text and superimposing the plurality of bidirectional attention data together to obtain cross-attention data between the candidate text and each modality;

a similarity processing layer configured to calculate a similarity between the video segment and the candidate text according to each cross-attention data of each modality of the video segment and the cross-attention data of the candidate text; and an outputting layer configured to acquire a plurality of similarities between the video segment and each candidate text in the set of candidate text, and performing ranking on the similarities, and determine one or more candidate texts as the live comments of the video segment according to the ranking result of the similarities, wherein the plurality of similarities are obtained by the separate processing on the video segment and each candidate text in the set of candidate text by the feature extracting layer, the multi-modality cross-matching layer, and the similarity processing layer.

J. The device according to paragraph I, wherein the plurality of modalities in the video segment at least include: an image modality and a sound modality;

the feature extracting layer includes:

a first text encoding unit configured to perform semantic feature encoding on the candidate text to generate feature data of the candidate text;

an image encoding unit configured to perform image feature encoding on the images of a plurality of frames in the video segment to generate feature data of the image modality;

a sound encoding unit configured to perform audio feature encoding on the audio data in the video segment to generate feature data of the sound modality.

K. The device according to paragraph J, wherein the multi-modality cross-matching layer includes:

a first text attention processing unit configured to calculate bidirectional attention data between feature data of the candidate text and feature data of the image modality, feature data of the sound modality, and superimpose the two bidirectional attention data together to obtain cross-attention data of the candidate text;

an image attention processing unit configured to calculate bidirectional attention data between the feature data of an image modality and the feature data of the sound modality, feature data of the candidate text, and superimpose the two bidirectional attention data to obtain cross-attention data of the image modality;

a sound attention processing unit configured to calculate bidirectional attention data between the feature data of the sound modality and the feature data of the image mode, the feature data of the candidate text, and superimpose the two bidirectional attention data to obtain the cross-attention data of the sound modality.

L. The device according to paragraph I, wherein the plurality of modalities in the video segment at least include: an image modality, a sound modality, and an existing text, the feature extracting layer includes:

a first text encoding unit configured to perform semantic feature encoding on the candidate text to generate feature data of the candidate text;

a second text encoding unit configured to perform semantic feature encoding on the video text in the video segment to generate feature data of the existing text;

an image encoding unit configured to perform image feature encoding on the images of a plurality of frames in the video segment to generate feature data of the image modality; and a sound encoding unit configured to perform audio feature encoding on the audio data in the video segment to generate feature data of the sound modality.

M. The device according to paragraph L, wherein the multi-modality cross-matching layer includes:

a first text attention processing unit configured to calculate bidirectional attention data between feature data of the candidate text and feature data of the image modality, feature data of the sound modality and feature data of the existing text, and superimpose the three bidirectional attention data together to obtain cross-attention data of the candidate text;
a second text attention processing unit configured to calculate bidirectional attention data between the feature data of the existing text and the feature data of the candidate text, the feature data of the image modality and the feature data of the sound modality, and superimpose the three bidirectional attention data to obtain cross-attention data of the existing text;
an image attention processing unit configured to calculate bidirectional attention data between the feature data of an image modality and the feature data of the sound modality, feature data of the candidate text, the feature data of the existing text, and superimpose the three bidirectional attention data to obtain cross-attention data of the image modality;
a sound attention processing unit configured to calculate bidirectional attention data between the feature data of the sound modality and the feature data of the image mode, the feature data of the candidate text, the feature data of the existing text, and superimpose the two bidirectional attention data to obtain the cross attention data of the sound modality.

N. The device according to paragraph I, wherein the multi-modality cross-matching layer includes attention processing units corresponding to modalities respectively and an attention processing unit corresponding to the candidate text, and each attention processing unit includes: a self-attention processing module and a cross-attention processing module, the self-attention processing module is configured to perform self-attention calculation processing on the feature data of each modality and the feature data of the candidate text to generate corresponding self-attention data, the cross-attention processing module is configured to calculate a plurality of bidirectional attention data between self-attention data of each modality and the self-attention data of other modalities and the self-attention data of the candidate text with respect to each modality, and superimpose the plurality of bidirectional attention data together, to obtain cross-attention data between the modality and other various modalities and candidate texts, and calculate bidirectional attention data between the self-attention data of the candidate text and the self-attention data of each modality with respect to the candidate text, and superimpose the plurality of bidirectional attention data together, to obtain cross-attention data between the candidate text and each modality.

O. The device according to paragraph I, wherein the similarity processing layer includes:
a modality fusing unit configured to fuse the cross-attention data corresponding to the modalities respectively to generate a fusion attention vector corresponding to the video segment;
a similarity calculating unit configured to calculate a similarity between the fusion attention vector corresponding to the video segment and the cross-attention data corresponding to the candidate text, as the similarity between the video segment and the candidate text.

P. An electronic apparatus, including:
a processing unit; and
a memory coupled to the processing unit and including instructions stored thereon, the instructions, when executed by the processing unit, causing the electronic apparatus to perform operations, the operations include:
extracting feature data of a plurality of modalities in the video segment and extracting feature data of the candidate text, with respect to a video segment and each candidate text in a set of candidate texts;
calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, with respect to a video segment and each candidate text in a set of candidate texts;
calculating bidirectional attention data between the feature data of the candidate text and the feature data of each modality with respect to the candidate text and superimposing the plurality of bidirectional attention data together to obtain cross-attention data between the candidate text and each modality, with respect to a video segment and each candidate text in a set of candidate texts;
calculating a similarity between the video segment and the candidate text according to each cross-attention data of each modality of the video segment and the cross-attention data of the candidate text, with respect to a video segment and each candidate text in a set of candidate texts; and
performing ranking on the similarities between the video segment and each candidate text in the set of candidate texts, and determining one or more candidate texts as the live comments of the video segment according to the ranking result of the similarities.

Q. The electronic apparatus according to the paragraph P, wherein the processing of calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, and the calculating bidirectional attention data between the feature data of the candidate text and the feature data of each modality with respect to the candidate text and superimposing the plurality of bidirectional attention data together to obtain cross-attention data between the candidate text and each modality further includes:
performing self-attention calculation processing on the feature data of each modality and the feature data of the candidate text, and generating self-attention data of each modality and self-attention data of the candidate text;
calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts;
calculating bidirectional attention data between the self-attention data of the candidate text and the self-attention data of each modality with respect to the candidate text, and superimposing the plurality of bidirectional attention data together, to obtain cross-attention data between the candidate text and each modality.

R. The electronic apparatus according to the paragraph P, wherein the operations further include:

acquiring a plurality of first frame feature vectors corresponding to images of a plurality of frames in a video segment;

acquiring a plurality of first live comment feature vectors corresponding to a plurality of existing live comments in the video segment;

calculating a first attention vector of each first live comment feature vector with respect to the plurality of first frame feature vectors, as a second live comment feature vector corresponding to each existing live comment;

generating a plurality of output word vectors of a new live comment according to the plurality of second live comment feature vectors.

S. The electronic apparatus according to the paragraph P, wherein the generating a plurality of output word vectors of a new live comment according to the plurality of second live comment feature vectors includes:

predicting a plurality of subsequent output word vectors according to the context relationship based on a given word vector as an initial output word vector of the new live comment, and calculating an initial output word vector and a plurality of subsequent output word vectors, as the output word vectors of the new live comments with respect to each of the first frame feature vector and the second attention vector of each second live comment feature vector.

Conclusion

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation", "one implementation", "some implementations", or "other implementations" may mean that a particular feature, structure, or characteristic described in connection with one or more implementations may be included in at least some implementations, but not necessarily in all implementations. The various appearances of "an implementation", "one implementation", or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

Conditional language such as, among others, "can," "could," "might" or "may," unless specifically stated otherwise, are otherwise understood within the context as used in general to present that certain examples include, while other examples do not include, certain features, elements and/or steps. Thus, such conditional language is not generally intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate examples are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims It would be obvious to one skilled in the art that, all or part of steps for implementing the above embodiments may be accomplished by hardware related to programs or instructions. The above program may be stored in a computer readable storing medium. Such program may perform the steps of the above embodiments upon being executed. The above storing medium may include: ROM, RAM, magnetic disk, or optic disk or other medium capable of storing program codes.

It should be noted that the foregoing embodiments are merely used to illustrate the technical solution of the present disclosure, and not to limit the present disclosure. Although the present disclosure has been described in detail with reference to the foregoing embodiments, one skilled in the art would understand that the technical solutions recited in the foregoing embodiments may be modified or all or a part of the technical features may be replaced equally. These modifications and replacements are not intended to make corresponding technical solution depart from the scope of the technical solution of embodiments of the present disclosure.

The invention claimed is:

1. A device comprising:
a feature extracting layer configured to extract feature data of a plurality of modalities in a video segment and extract feature data of each candidate text in a set of candidate texts, wherein the plurality of modalities includes at least an image modality and a sound modality of the video segment;
a multi-modality cross-matching layer configured to perform the following processing:
calculating a first plurality of bidirectional attention data between feature data of the image modality, feature data of the sound modality, and the feature data of the candidate text with respect to each modality, and superimposing the first plurality of bidirectional attention data together, to obtain first cross-attention data between the image modality and the sound modality the modality and a comment paragraph;
calculating a second plurality of bidirectional attention data between the feature data of the sound modality and the feature data of the image modality and the feature data of the candidate text with respect to each modality, and superimposing the second plurality of bidirectional attention data together, to obtain second cross-attention data between the sound modality and the image modality and the comment paragraph; and
calculating a third plurality of bidirectional attention data between the feature data of the candidate text and the feature data of the image modality and the feature data of the sound modality with respect to the candidate text and superimposing the third plurality of bidirectional attention data together to obtain third cross-attention data between the candidate text and the image modality and the sound modality;
a similarity processing layer configured to calculate a similarity between the video segment and the candidate text according to the first cross-attention data of the image modality, the second cross-attention data of the sound modality, and the third cross-attention data of the candidate text; and
an outputting layer configured to acquire a plurality of similarities between the video segment and each candidate text in the set of candidate texts, and performing ranking on the similarities, and determine one or more candidate texts as live comments of the video segment according to a ranking result of the similarities, wherein the plurality of similarities are obtained by separate processing on the video segment and each candidate text in the set of candidate texts by the feature extracting layer, the multi-modality cross-matching layer, and the similarity processing layer.

2. The device according to claim 1, wherein the feature extracting layer comprises:
a first text encoding unit configured to perform semantic feature encoding on the candidate text to generate feature data of the candidate text;
an image encoding unit configured to perform image feature encoding on the images of a plurality of frames in the video segment to generate feature data of the image modality; and
a sound encoding unit configured to perform audio feature encoding on the audio data in the video segment to generate feature data of the sound modality.

3. The device according to claim 2, wherein the multi-modality cross-matching layer comprises:
a first text attention processing unit configured to calculate bidirectional attention data between feature data of the candidate text and feature data of the image modality, feature data of the sound modality, and superimpose the two bidirectional attention data together to obtain cross-attention data of the candidate text;
an image attention processing unit configured to calculate bidirectional attention data between the feature data of an image modality and the feature data of the sound modality, feature data of the candidate text, and superimpose the two bidirectional attention data to obtain cross-attention data of the image modality; and
a sound attention processing unit configured to calculate bidirectional attention data between the feature data of the sound modality and the feature data of the image modality, the feature data of the candidate text, and superimpose the two bidirectional attention data to obtain the cross-attention data of the sound modality.

4. The device according to claim 1, wherein the plurality of modalities in the video segment at least comprise: an image modality, a sound modality, and an existing text, and the feature extracting layer comprises:
a first text encoding unit configured to perform semantic feature encoding on the candidate text to generate feature data of the candidate text;
a second text encoding unit configured to perform semantic feature encoding on the video text in the video segment to generate feature data of the existing text;
an image encoding unit configured to perform image feature encoding on the images of a plurality of frames in the video segment to generate feature data of the image modality; and
a sound encoding unit configured to perform audio feature encoding on the audio data in the video segment to generate feature data of the sound modality.

5. The device according to claim 4, wherein the multi-modality cross-matching layer comprises:
a first text attention processing unit configured to calculate bidirectional attention data between feature data of the candidate text and feature data of the image modality, feature data of the sound modality and feature data of the existing text, and superimpose the three bidirectional attention data together to obtain cross-attention data of the candidate text;
a second text attention processing unit configured to calculate bidirectional attention data between the feature data of the existing text and the feature data of the candidate text, the feature data of the image modality and the feature data of the sound modality, and superimpose the three bidirectional attention data to obtain cross-attention data of the existing text;

an image attention processing unit configured to calculate bidirectional attention data between the feature data of an image modality and the feature data of the sound modality, feature data of the candidate text, the feature data of the existing text, and superimpose the three bidirectional attention data to obtain cross-attention data of the image modality;

a sound attention processing unit configured to calculate bidirectional attention data between the feature data of the sound modality and the feature data of the image modality, the feature data of the candidate text, the feature data of the existing text, and superimpose the two bidirectional attention data to obtain the cross-attention data of the sound modality.

6. The device according to claim 1, wherein the multi-modality cross-matching layer comprises attention processing units corresponding to modalities respectively and an attention processing unit corresponding to the candidate text, and each attention processing unit comprises: a self-attention processing module and a cross-attention processing module, the self-attention processing module is configured to perform self-attention calculation processing on the feature data of each modality and the feature data of the candidate text to generate corresponding self-attention data, the cross-attention processing module is configured to calculate a plurality of bidirectional attention data between self-attention data of each modality and the self-attention data of other modalities and the self-attention data of the candidate text with respect to each modality, and superimpose the plurality of bidirectional attention data together, to obtain cross-attention data between the modality and each of other modalities and candidate texts, and calculate bidirectional attention data between the self-attention data of the candidate text and the self-attention data of each modality with respect to the candidate text, and superimpose the plurality of bidirectional attention data together, to obtain cross-attention data between the candidate text and each modality.

7. The device according to claim 1, wherein the similarity processing layer comprises:

a modality fusing unit configured to fuse the cross-attention data corresponding to the modalities respectively to generate a fusion attention vector corresponding to the video segment;

a similarity calculating unit configured to calculate a similarity between the fusion attention vector corresponding to the video segment and the cross-attention data corresponding to the candidate text, as the similarity between the video segment and the candidate text.

8. A method, comprising:

extracting feature data of a plurality of modalities in a video segment and extracting feature data of each candidate text in a set of candidate texts, wherein the plurality of modalities includes at least an image modality and a sound modality of the video segment;

calculating a first plurality of bidirectional attention data between feature data of the image modality, feature data the sound modality, and the feature data of the candidate text with respect to each modality, and superimposing the first plurality of bidirectional attention data together, to obtain first cross-attention data between the modality and the image modality and the sound modality and a comment paragraph;

calculating a second plurality of bidirectional attention data between the feature data of the sound modality and the feature data of the image modality and the feature data of the candidate text with respect to each modality, and superimposing the second plurality of bidirectional attention data together, to obtain second cross-attention data between the sound modality and the image modality and the comment paragraph;

calculating a third plurality of bidirectional attention data between the feature data of the candidate text and the feature data of the image modality and the feature data of the sound modality with respect to the candidate text and superimposing the third plurality of bidirectional attention data together to obtain third cross-attention data between the candidate text and the image modality and the sound modality;

calculating a similarity between the video segment and the candidate text according to the first cross-attention data of the image modality, the second cross-attention data of the sound modality, and the third cross-attention data of the candidate text; and performing ranking on the similarities between the video segment and each candidate text in the set of candidate texts, and determining one or more candidate texts as live comments of the video segment according to a ranking result of the similarities, wherein the plurality of similarities are obtained by separate processing on the video segment and each candidate text in the set of candidate texts by a feature extracting layer, a multi-modality cross-matching layer, and a similarity processing layer.

9. The method according to claim 8, wherein the calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, and the calculating bidirectional attention data between the feature data of the candidate text and the feature data of each modality with respect to the candidate text and superimposing the plurality of bidirectional attention data together to obtain cross-attention data between the candidate text and each modality further comprises:

performing self-attention calculation processing on the feature data of each modality and the feature data of the candidate text, and generating self-attention data of each modality and self-attention data of the candidate text;

calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts; and calculating bidirectional attention data between the self-attention data of the candidate text and the self-attention data of each modality with respect to the candidate text, and superimposing the plurality of bidirectional attention data together, to obtain cross-attention data between the candidate text and each modality.

10. The method according to claim 8, wherein the calculating a similarity between the video segment and the candidate text according to each cross-attention data of each modality of the video segment and the cross-attention data of the candidate text comprises:

fusing the cross-attention data corresponding to each modality to generate a fusion attention vector corresponding to the video segment; and calculating a similarity between the fusion attention vector corresponding to the video segment and the cross-attention data corresponding to the candidate text, as the similarity between the video segment and the candidate text.

11. The method according to claim 8, further comprising:

acquiring a plurality of first frame feature vectors corresponding to images of a plurality of frames in a video segment;

acquiring a plurality of first live comment feature vectors corresponding to a plurality of existing live comments in the video segment;

calculating a first attention vector of each first live comment feature vector with respect to the plurality of first frame feature vectors, as a second live comment feature vector corresponding to each existing live comment;

generating a plurality of output word vectors of a new live comment according to the plurality of second live comment feature vectors.

12. The method according to claim 11, wherein the generating a plurality of output word vectors of a new live comment according to the plurality of second live comment feature vectors comprises:

predicting a plurality of subsequent output word vectors according to a context relationship based on a given word vector as an initial output word vector of the new live comment, and calculating an initial output word vector and a plurality of subsequent output word vectors, as the output word vectors of the new live comments with respect to each of the first frame feature vector and the second attention vector of each second live comment feature vector.

13. The method according to claim 11, wherein the acquiring a plurality of first frame feature vectors corresponding to images of a plurality of frames in a video segment comprises:

acquiring a plurality of first frame feature vectors corresponding to the images of the plurality of frames in the video segment, and performing context relationship processing on the first frame feature vectors to generate a plurality of first frame feature vectors containing the context relationship.

14. The method according to claim 11, wherein the acquiring a plurality of first live comment feature vectors corresponding to a plurality of existing live comments in the video segment comprises:

acquiring a plurality of first live comment feature vectors corresponding to the plurality of existing live comments in the video segment, and performing context relationship processing on the plurality of first live comment feature vectors to generate a plurality of first live comment feature vectors containing the context relationship.

15. An electronic apparatus, comprising:

a processing unit; and a memory coupled to the processing unit and comprising instructions stored thereon, the instructions, when executed by the processing unit, causing the electronic apparatus to perform operations, the operations comprising:

extracting feature data of a plurality of modalities in a video segment and extracting feature data of each candidate text in a set of candidate texts, wherein the plurality of modalities includes at least an image modality and a sound modality of the video segment;

calculating a first plurality of bidirectional attention data between feature data of the image modality and feature data the sound modality, and the feature data of the candidate text with respect to each modality, and superimposing the first plurality of bidirectional attention data together, to obtain first cross-attention data between the image modality and the sound modality and the comment paragraph;

calculating a second plurality of bidirectional attention data between the feature data of the sound modality and the feature data of the image modality and the feature data of the candidate text with respect to each modality, and superimposing the second plurality of bidirectional attention data together, to obtain second cross-attention data between the sound modality and the image modality and the comment paragraph;

calculating a third plurality of bidirectional attention data between the feature data of the candidate text and the feature data of the image modality and the feature data of the sound modality with respect to the candidate text and superimposing the third plurality of bidirectional attention data together to obtain third cross-attention data between the candidate text and the image modality and the sound modality;

calculating a similarity between the video segment and the candidate text according to the first cross-attention data of the image modality, the second cross-attention data of the sound modality, and the third cross-attention data of the candidate text; and performing ranking on the similarities between the video segment and each candidate text in the set of candidate texts, and determining one or more candidate texts as the live comments of the video segment according to the ranking result of the similarities, wherein the plurality of similarities are obtained by separate processing on the video segment and each candidate text in the set of candidate texts by a feature extracting layer, a multi-modality cross-matching layer, and a similarity processing layer.

16. The electronic apparatus according to claim 15, the instructions for calculating a plurality of bidirectional attention data between the feature data of each modality and the feature data of each of other modalities and the feature data of the candidate text with respect to each modality, and superimposing the plurality of bidirectional attention data together, to obtain cross-attention data between the modality and each of other modalities and the comment paragraph, and the calculating bidirectional attention data between the feature data of the candidate text and the feature data of each modality with respect to the candidate text and superimposing the plurality of bidirectional attention data together to obtain cross-attention data between the candidate text and each modality further comprising instructions that, when executed by the processing unit, cause the electronic apparatus to perform operations comprising:

performing self-attention calculation processing on the feature data of each modality and the feature data of the candidate text, and generating self-attention data of each modality and self-attention data of the candidate text;

calculating a plurality of bidirectional attention data between self-attention data of each modality and the self-attention data of other modalities and the self-attention data of the candidate text with respect to each modality, and superimposing the plurality of bidirectional attention data together, to obtain cross-attention data between the modality and other various modalities and candidate texts; and calculating bidirectional attention data between the self-attention data of the candidate text and the self-attention data of each modality with respect to the candidate text, and superimposing the plurality of bidirectional attention data together, to obtain cross-attention data between the candidate text and each modality.

17. The electronic apparatus according to claim 15, the instructions for calculating a similarity between the video segment and the candidate text according to each cross-attention data of each modality of the video segment and the cross-attention data of the candidate text further comprising instructions that, when executed by the processing unit, cause the electronic apparatus to perform operations comprising:

fusing the cross-attention data corresponding to each modality to generate a fusion attention vector corresponding to the video segment; and calculating a similarity between the fusion attention vector corresponding to the video segment and the cross-attention data corresponding to the candidate text, as the similarity between the video segment and the candidate text.

18. The electronic apparatus according to claim 15, the memory further comprising instructions that, when executed by the processing unit, cause the electronic apparatus to perform operations comprising:

acquiring a plurality of first frame feature vectors corresponding to images of a plurality of frames in a video segment;

acquiring a plurality of first live comment feature vectors corresponding to a plurality of existing live comments in the video segment;

calculating a first attention vector of each first live comment feature vector with respect to the plurality of first frame feature vectors, as a second live comment feature vector corresponding to each existing live comment;

generating a plurality of output word vectors of a new live comment according to the plurality of second live comment feature vectors.

19. The electronic apparatus according to claim 18, the instructions for generating a plurality of output word vectors of a new live comment according to the plurality of second live comment feature vectors further comprising instructions that, when executed by the processing unit, cause the electronic apparatus to perform operations comprising:

predicting a plurality of subsequent output word vectors according to a context relationship based on a given word vector as an initial output word vector of the new live comment, and calculating an initial output word vector and a plurality of subsequent output word vectors, as the output word vectors of the new live comments with respect to each of the first frame feature vector and the second attention vector of each second live comment feature vector.

20. The electronic apparatus according to claim 18, the instructions for acquiring a plurality of first frame feature vectors corresponding to images of a plurality of frames in a video segment further comprising instructions that, when executed by the processing unit, cause the electronic apparatus to perform operations comprising:

acquiring a plurality of first frame feature vectors corresponding to the images of the plurality of frames in the video segment, and performing context relationship processing on the first frame feature vectors to generate a plurality of first frame feature vectors containing the context relationship.

\* \* \* \* \*